(12) United States Patent
Ham

(10) Patent No.: US 11,644,380 B2
(45) Date of Patent: May 9, 2023

(54) INTEGRATED RAPID INFRASTRUCTURE MONITORING SYSTEMS AND METHODS OF USING SAME

(71) Applicant: Board of Regents, The University of Texas System, Austin, TX (US)

(72) Inventor: Suyun Ham, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/488,699

(22) Filed: Sep. 29, 2021

(65) Prior Publication Data

US 2022/0099522 A1 Mar. 31, 2022

Related U.S. Application Data

(60) Provisional application No. 63/084,685, filed on Sep. 29, 2020.

(51) Int. Cl.
G01M 5/00 (2006.01)

(52) U.S. Cl.
CPC ........ G01M 5/0008 (2013.01); G01M 5/0033 (2013.01); G01M 5/0075 (2013.01); G01M 5/0091 (2013.01)

(58) Field of Classification Search
CPC .... G01M 5/00; G01M 5/0008; G01M 5/0066; G01M 5/0075; G01M 5/0033; G01M 5/0091; G01M 7/00; G01M 7/02; G01M 7/022; G01M 7/025; G01M 7/04; G01M 7/045; G01M 7/06; G01M 7/08; G01M 13/028; G01M 13/045; G01M 17/0078; G01M 5/005; G01M 5/0058; E01D 19/125; E01D 22/00; E01C 23/01; G01N 29/00; G01N 29/04; G01N 29/045; G01N 3/32; G01N 3/34; G01V 2210/10; G01V 2210/12; G01V 2210/121; G01V 2210/1214; G01V 2210/127; G01V 2210/1295

See application file for complete search history.

(56) References Cited

U.S. PATENT DOCUMENTS

| | | | |
|---|---|---|---|
| 2020/0096481 A1* | 3/2020 | Zhang | G01N 29/045 |
| 2020/0300813 A1* | 9/2020 | Mazzeo | G01N 29/045 |
| 2021/0196409 A1* | 7/2021 | Blanckaert | F16H 25/06 |
| 2021/0293306 A1* | 9/2021 | Brouwer | F16H 1/125 |
| 2021/0310202 A1* | 10/2021 | Doy | E01C 23/088 |

* cited by examiner

*Primary Examiner* — Son T Le
*Assistant Examiner* — Matthew W. Baca
(74) *Attorney, Agent, or Firm* — Todd Allen Serbin; Nexsen Pruet, PLLC

(57) ABSTRACT

An integrated rapid infrastructure monitoring system for identifying defects in an underlying surface, comprising: at least one actuator; and, at least one impactor operatively connected to the actuator, wherein the actuator is configured to transition the integrated rapid infrastructure monitoring system from a first configuration with at least one of a motive force and an impact bounce force of the impactor, where the impactor is located on a first side of the integrated rapid infrastructure monitoring system, to a second configuration, where the impactor is located on a second side of the integrated rapid infrastructure monitoring system.

20 Claims, 24 Drawing Sheets

INTEGRATED RAPID INFRASTRUCTURE MONITORING SYSTEMS AND METHODS OF USING SAME

RELATED APPLICATIONS

This application claims the benefit of priority under 35 U.S.C. § 119(e) of U.S. Provisional Patent Application No. 63/084,685 filed Sep. 29, 2020, the contents of which are incorporated herein by reference in their entirety.

FIELD

The present invention, in some embodiments thereof, relates to infrastructure maintenance and, more particularly, but not exclusively, to systems for assessing infrastructure maintenance needs.

BACKGROUND

The National Bridge Inspection program regulations require states to inspect highway bridges persistently on a reoccurring timetable that can vary depending on the type of infrastructure. Bridges are critical components of transportation infrastructure. Bridge decks, in particular, are the most susceptible components in a bridge to traffic safety and material deterioration due to the direct exposure to traffic and other deteriorating factors (e.g., temperature, moisture, deicing agents). Their service life is shorter than other components.

The most serious problem in bridge monitoring is internal damage like vertical cracks or delamination, which crack horizontally, mainly caused by corroded steel reinforcements. Generally, reinforcement corrosion in bridge decks occurs due to environmental conditions such as migrated moisture and chemicals (e.g., chloride ions). The formation of the corrosion products causes volume expansion of the reinforcement. Eventually, delamination forms due to this mechanism. In addition, the produced delamination also causes vertical cracks to extend the delamination to the surface. Increased levels and number of these vertical crack damages even accelerate the corrosion process. As a result, further degradation (e.g., potholes) can be caused by the negative interactions among delamination, vertical cracks, and reinforcement corrosion with external factors (e.g., traffic load, freeze-thaw cycle). Since the produced degradations are critical for roadway safety and bridge deck service life, monitoring these degradations are significant to maintaining the bridge deck in the early-stage deterioration to ensure the infrastructure is operating safely and efficiently.

Detection of bridge deck delamination has been studied for several decades. Unfortunately, delamination is an invisible process until potholes or significant vertical cracks are present. Thus, visual inspections to identify the delamination are challenging. Core extraction—a destructive test—can identify the delamination, but it may cause damages on the bridge deck. Nondestructive testing (NDT) techniques have been developed to detect these damages. Among them, flexural vibration modes using several NDT approaches (e.g., chain dragging, hammer sounding, impact-echo) have been widely used to identify the delamination. In particular, the application of air-coupled sensors has gained attention to improve the conventional impact-echo approach. Consequently, advanced impact-echo techniques using flexural vibration mode and air-coupled sensing have been studied with various mechanical wave excitation, collection, and interpretation methods: ice sphere impact, chain drag data collected from the micro-electromechanical system (MEMS) sensors, deep learning model analysis.

For vertical crack detection, a Rayleigh wave, which utilizes pulse propagation characteristics such as wave velocity or attenuation, has demonstrated sensitivity to cracks. The attenuated wave energy is estimated from the difference of wave responses (e.g., maximum amplitude, time-windowed wave energy, spectral magnitude from two receivers placed on either side of a vertical crack). For practical corroded reinforcement detection that can be conducted rapidly and indirectly, a ground-penetrating radar (GPR) technique is commonly used. The GPR technique is based on transmitting pulsed electromagnetic (EM) waves into the medium and measuring the reflected EM waves from conductive materials (e.g., steel reinforcement). The EM wave response includes the information of the degrees of concrete degradation and reinforcement corrosion.

Most technologies have been designed to be used on foot in the field, which requires traffic control for lane closures. To improve scanning speed, there have been several studies, including a rapid bridge scanning system using tire chains for delamination detection. Despite these efforts, these scanning speeds are still limited, presenting relatively low pulse repetition frequency (PRF), due to the nature of a typical mechanical impactor.

SUMMARY

According to an aspect of some embodiments of the present invention there is provided an integrated rapid infrastructure monitoring system for identifying defects in an underlying surface, comprising: at least one actuator; and, at least one impactor operatively connected to the actuator, wherein the actuator is configured to transition the integrated rapid infrastructure monitoring system from a first configuration with at least one of a motive force and an impact bounce force of the impactor, where the impactor is located on a first side of the integrated rapid infrastructure monitoring system, to a second configuration, where the impactor is located on a second side of the integrated rapid infrastructure monitoring system.

In an embodiment of the invention, the system further comprises a high elastic cable or wire connecting each at least one actuator to each at least one impactor.

In an embodiment of the invention, the at least one impactor is at least partially constructed at least one of metal and carbon.

In an embodiment of the invention, the at least one actuator is configured to transition the integrated rapid infrastructure monitoring system from the second configuration to the first configuration with at least one of a motive force and an impact bounce force of the impactor.

In an embodiment of the invention, the least one actuator is a DC motor.

In an embodiment of the invention, the DC motor has more than 180 degrees of rotation.

In an embodiment of the invention, the DC motor has at least 1000 RPM speed.

In an embodiment of the invention, at least one of the first configuration and the second configuration includes at least one impactor physically contacting the underlying surface.

In an embodiment of the invention, the system further comprises at least one sensor for sensing impacts on the underlying surface by the at least one impactor.

In an embodiment of the invention, the at least one sensor is at least one of a MEMS sensor, GPR, LIDAR, a tomographic sensor, a position sensor and an image sensor.

In an embodiment of the invention, the system further comprises an automatic height-adjustable system with a frame and at least one elevation actuator operatively connected to the frame by at least one frame element and configured to raise and/or lower the frame relative to the underlying surface.

In an embodiment of the invention, the system further comprises at least one distance sensor for sensing distance of the frame from the underlying surface.

In an embodiment of the invention, the system further comprises at least one controller for automatically controlling the at least one elevation actuator to raise and/or lower the frame to a desired distance from the underlying surface during integrated rapid infrastructure monitoring system movement.

According to an aspect of some embodiments of the present invention there is further provided method of using an integrated rapid infrastructure monitoring system for scanning an underlying surface, comprising: moving at least one impactor in a first direction from a first configuration of the integrated rapid infrastructure monitoring system towards a second configuration; impacting the at least one impactor on the underlying surface in the second configuration; measuring the impacting using at least one sensor; moving the at least one impactor in a second direction from the second configuration towards the first configuration; impacting the at least one impactor on the underlying surface in the first configuration; and, measuring the impacting using at least one sensor.

In an embodiment of the invention, moving is effectuated by at least one of an actuator and a bouncing force from the impacting.

In an embodiment of the invention, the method further comprises automatically raising and/or lowering at least one of the at least one impactor and the at least one sensor to a desired distance above the underlying surface during scanning using at least one elevation actuator.

In an embodiment of the invention, the at least one impactor is a plurality of impactors which operate on a preset delay to, in combination, achieve a desired pulse repetition frequency of the integrated rapid infrastructure monitoring system.

In an embodiment of the invention, the at least one sensor is used to collect at least one of mechanical wave data, electromagnetic wave data, imaging data and position data.

In an embodiment of the invention, two or more of mechanical wave, electromagnetic wave, image and position data collection occurs simultaneously.

In an embodiment of the invention, the method further comprises adjusting the rate of impacting by performing at least one of: increasing or decreasing the velocity of the integrated rapid infrastructure monitoring system; modifying the number of impactors; and, modifying the configuration of the at least one impactor on a wheel to which the at least one impactor is attached.

BRIEF DESCRIPTION OF THE DRAWINGS

Some embodiments of the invention are herein described, by way of example only, with reference to the accompanying drawings and images. With specific reference now to the drawings/images in detail, it is stressed that the particulars shown are by way of example, are not necessarily to scale, and are for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
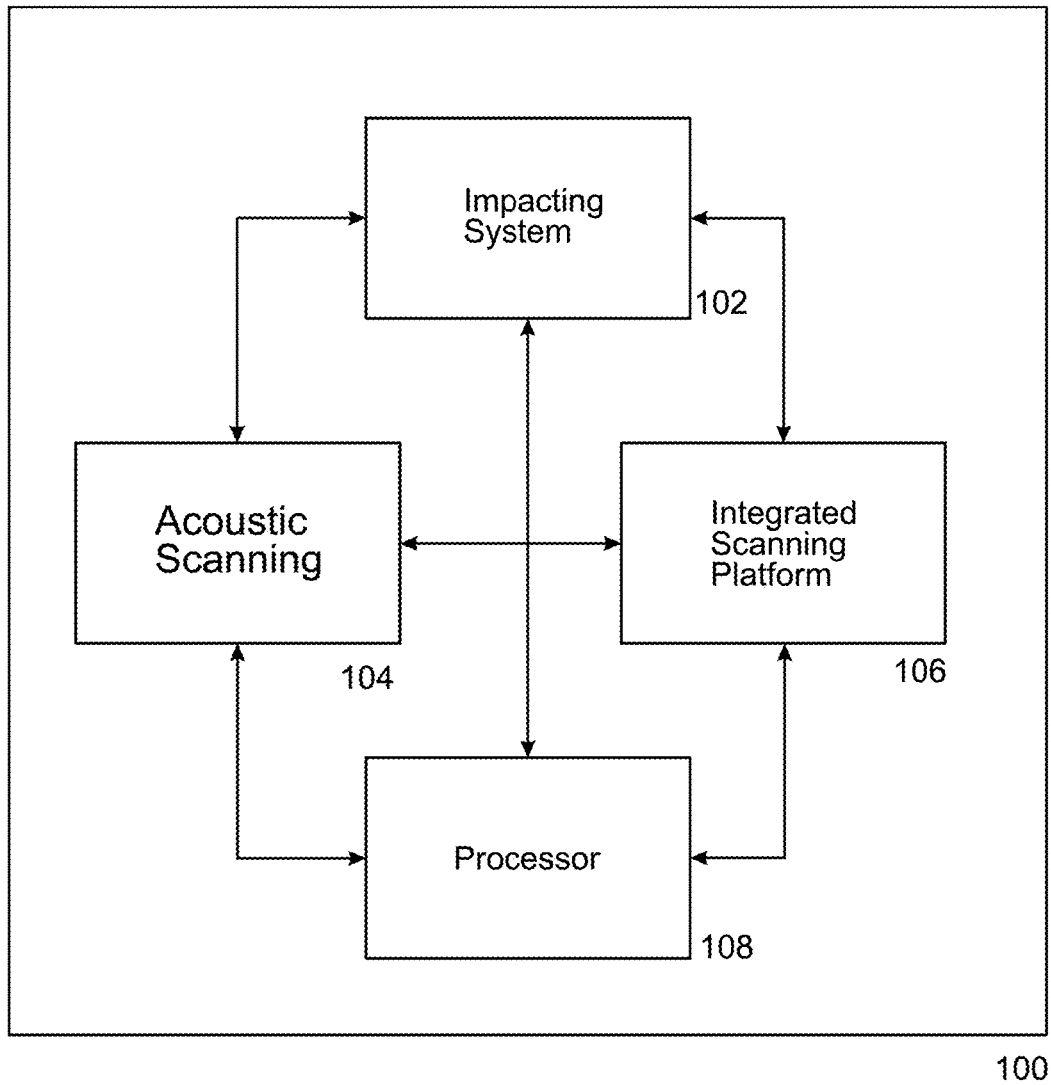
FIG. 1 is a block diagram of an integrated rapid infrastructure monitoring system, in accordance with an exemplary embodiment of the invention.

The present invention, in some embodiments thereof, relates to infrastructure maintenance and, more particularly, but not exclusively, to systems for assessing infrastructure maintenance needs.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Proper maintenance and operation of deteriorating infrastructure requires timely detection and precise diagnosis of any dangerous damage, and accurate estimation of possible structural performance degradation induced by the damage. However, existing non-destructive testing (NDT) methods for damage inspection are slow, detect only external surface conditions, and potentially cause traffic disruptions. Furthermore, information about critical damage and how the damage would impact the overall structural performance of the infrastructure is not readily available for engineers, decision-makers, and stakeholders using current technologies.

Therefore, what is generally provided herein are systems and methods for rapidly providing infrastructure scanning results to technical experts, decision-makers and stakeholders in the interests of providing better infrastructure maintenance and improving data reliability and quality while saving overall costs and reducing public and commercial inconveniences. Specific solutions described herein are directed towards solving the following technical problems in the art:

Existing or conventional impact sources or impactors provide inaccurate and unclean mechanical wave due to noises and their design. For example, chain impactors produce a clapping noise from each chain, and the existing impact machines experience resonance noise from impactor rods. That is, the vertical impactor naturally generates resonance frequency from the impactor (e.g., rod, regular hammer). The generated response noise can be very critical because it provides the wrong damage data.

Most conventional systems cannot generate impact source data rapidly due to the nature of their design. The number of impacts is referred to as pulse repetition frequency (PRF). Low PRF causes a very slow speed scan (1 mph), additionally and/or alternatively, the low PRF causes poor resolution of data since high speed scans result in missing damage information. For this reason, most conventional system in use today are implemented in a manual, hand-operated cart.

The automated crack evaluation (ACE) system described herein aims to perform rapid, traffic disruption-free inspection of internal/external concrete structures, such as bridges, with enhanced scanning qualities leveraging the integrated scanning platform, advanced impacting system, and a multichannel acoustic sensing unit. It should also be understood that the presently described system could also be used for scanning other infrastructure besides roadways/bridges, such as pipes or tubes, buildings/construction, and the like. Furthermore, the system could be employed for assessment in non-infrastructure applications as well.

Generally, and as will be described in more detail below, practical generation and detection of reliable and consistent mechanical waves, in some embodiments of the invention, are made possible using an automatic impactor and air-coupled sensors, offering the potential to overcome limitations associated with infrastructure assessment towards traffic disruption-free measurement. In some embodiments and as will be described in more detail below, the ACE system is configured with arrays of double-sided bounce impactors and micro-electromechanical system(s) (MEMSs) for conducting infrastructure inspection.

Generally, and as will be described in more detail below, the inspection can include detecting delamination, vertical cracks, and/or corroded reinforcement, impact-echo testing, wave scattering, wave attenuation, LIDAR and/or GPR sensing methods, respectively. In some embodiments, the ACE system described herein includes at least one of an advanced auto-impacting system, a multichannel acoustic scanning unit, and an integrated scanning platform.

Referring now to the drawings, FIG. 1 is a block diagram of an integrated rapid infrastructure monitoring system 100, in accordance with an exemplary embodiment of the invention. In an embodiment of the invention, the ACE system 100 includes at least one of an advanced auto-impacting system 102, a multichannel acoustic scanning system 104, an integrated scanning platform 106, and at least one controller/processor 108, for example for image and sensor readings processing and/or including software and/or software programming for performing same.

The following sections of the Detailed Description further illustrate exemplary details of the advanced auto-impacting system 102, the multichannel acoustic scanning system 104, and the integrated scanning platform 106, including additional features of the ACE system 100.

Figure 2A:
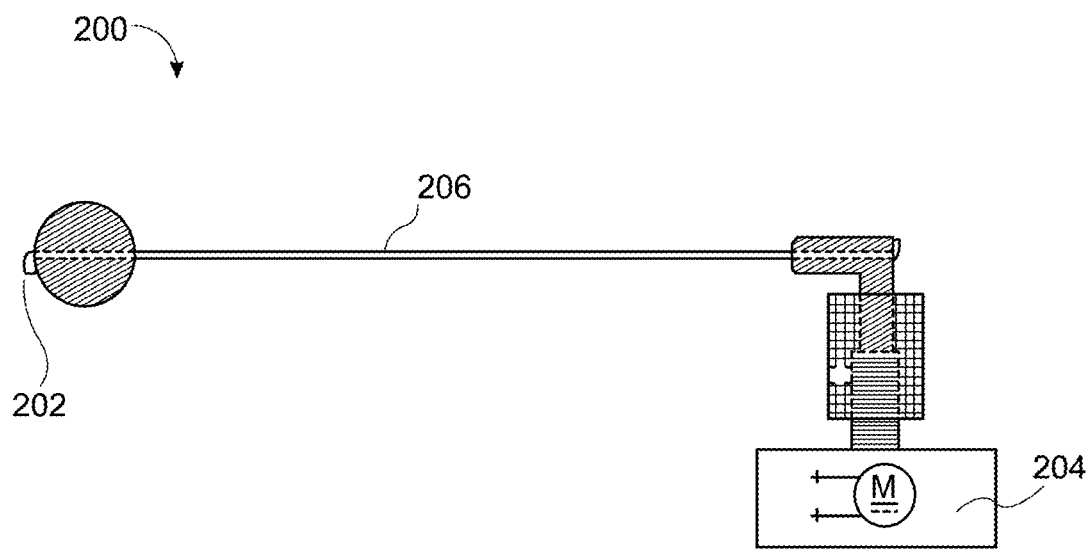
FIG. 2A is a schematic, top view of a double-sided bounce impact system, in accordance with an exemplary embodiment of the invention.

FIG. 2A is a schematic, top view of a double-sided bounce impacting (DSBI) system 200, in accordance with an exemplary embodiment of the invention. It should be understood that the DSBI system 200 is an exemplary embodiment of the advanced auto-impacting system 102, however, other impacting systems besides the DSBI system 200 could be used. It should be understood that this system 200 is called "double-sided" because the impactor 202 (shown as a ball shape in FIG. 2A) can be swung from one side (in a first direction, for example counter-clockwise) to the other, such as shown in FIG. 2C, using an actuator 204, such as a DC motor, and then back again (in a second direction, opposite the first direction, for example clockwise).

In some embodiments of the invention, the impactor 202 is connected to the actuator 204 using a cable or wire 206, for example a 0.063" piano wire (ASTM A228), optionally where the cable 206 is springy or resilient or has high elasticity. Exemplary wire 206, spring-back multipurpose 304 stainless steel wire, can be procured from McMaster-Carr at www.mcmaster.com/piano-wire/. In some embodiments, the wire is selected to be a certain diameter (e.g. less than 0.1" in diameter) to avoid certain resonance frequencies which may impact sensing quality.

In some embodiments of the invention, the impactor 202 is constructed at least partly of metal (e.g. steel) and/or carbon (e.g. a low-carbon steel ball).

In some embodiments of the invention, the actuator 204 has more than 180 degrees of rotation and is at least 1000 RPM in speed.

Figure 2B:
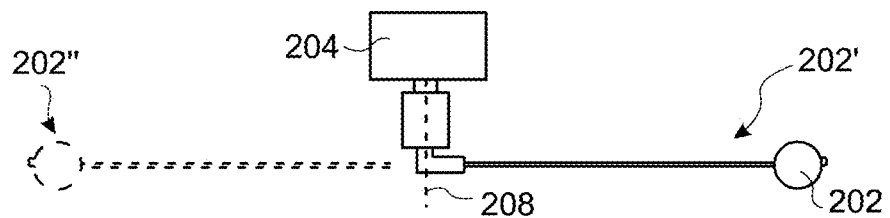
FIGS. 2B-2C are schematic, top and side views, respectively, of a double-sided bounce impact system in operation, in accordance with an exemplary embodiment of the invention.
Figure 2C:
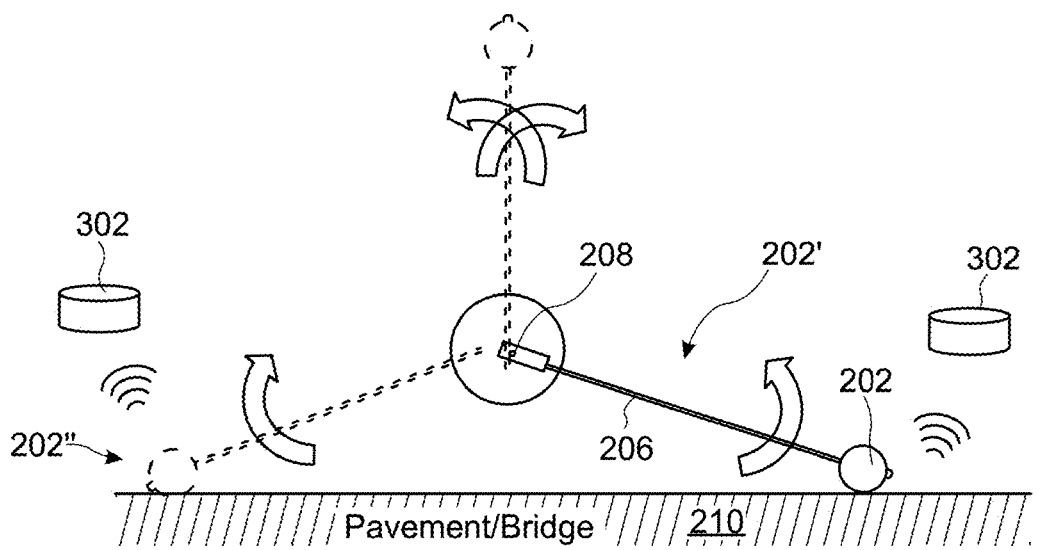

FIGS. 2B-2C are schematic, top and side views, respectively, of the DSBI system 200 system 200 in operation, in accordance with an exemplary embodiment of the invention. FIG. 2B shows the "double-sided" nature of the impact system 200 in an embodiment of the invention, wherein the actuator 204 of the system 200 causes the impactor 202 to switch back and forth between a first configuration 202' and a second configuration 202", around a common rotational axis 208, such as shown in more detail in FIG. 2C.

In some embodiments of the invention, the DSBI system 200 transitions between the first configuration 202' and the second configuration 202" at least partly by bouncing the impactor 202 against an underlying surface 210 and utilizing the rebounding force to change direction of movement of the impactor 202 (i.e. actuator movement is assisted by the bouncing force (or vice versa) or bouncing force is an alternative to actuator movement). It should be understood that the underlying surface 210 could be virtually any form, wherein the ACE system 100 is configured to scan appropriately the underlying surface 210 based on, as examples, shape or material type(s). Exemplary shapes could be more or less flat or planar like a roadway or a bridge deck (such as shown and described with respect to FIGS. 21-24B), or rounded/cylindrical like a pipe (such as shown and described with respect to FIGS. 25-26B). FIG. 2B shows how the actuator 204 and/or the bouncing force of the impactor 202 causes the impactor 202 to switch back and forth between right and left in the Figure. In some embodiments of the invention, the second configuration 202" is opposite or nearly opposite the first configuration 202'.

In an embodiment of the invention, the first configuration 202' and second configuration 202" are opposite or nearly opposite of each other in a rotational sense, for example at about 2-4 o'clock and about 8-10 o'clock, respectively, such as shown in FIG. 2C. Optionally, the rotational range of motion is larger or smaller than described above.

Advantages of such a system include a wide angle of motion (for generation of a strong impact signal such as a high amplitude mechanical wave) and/or a high rate of impact as the combination of actuator force and bouncing impactor 202 force, instigating movement in the opposite direction of the DSBI system 200, results in an extremely rapid and consistent PRF. In some embodiments, the system 200 provides up to 3-4 impacts/second/impactor when in operation. Optionally, the system 200 provides an even faster rate. Optionally, the system 200 provides a slower rate, for example, when the system 200 includes multiple impactors 202, such as shown and described with respect to FIGS. 3, 9-11, 14, 16, 17 and 21-24, inter alia.

Figure 3:
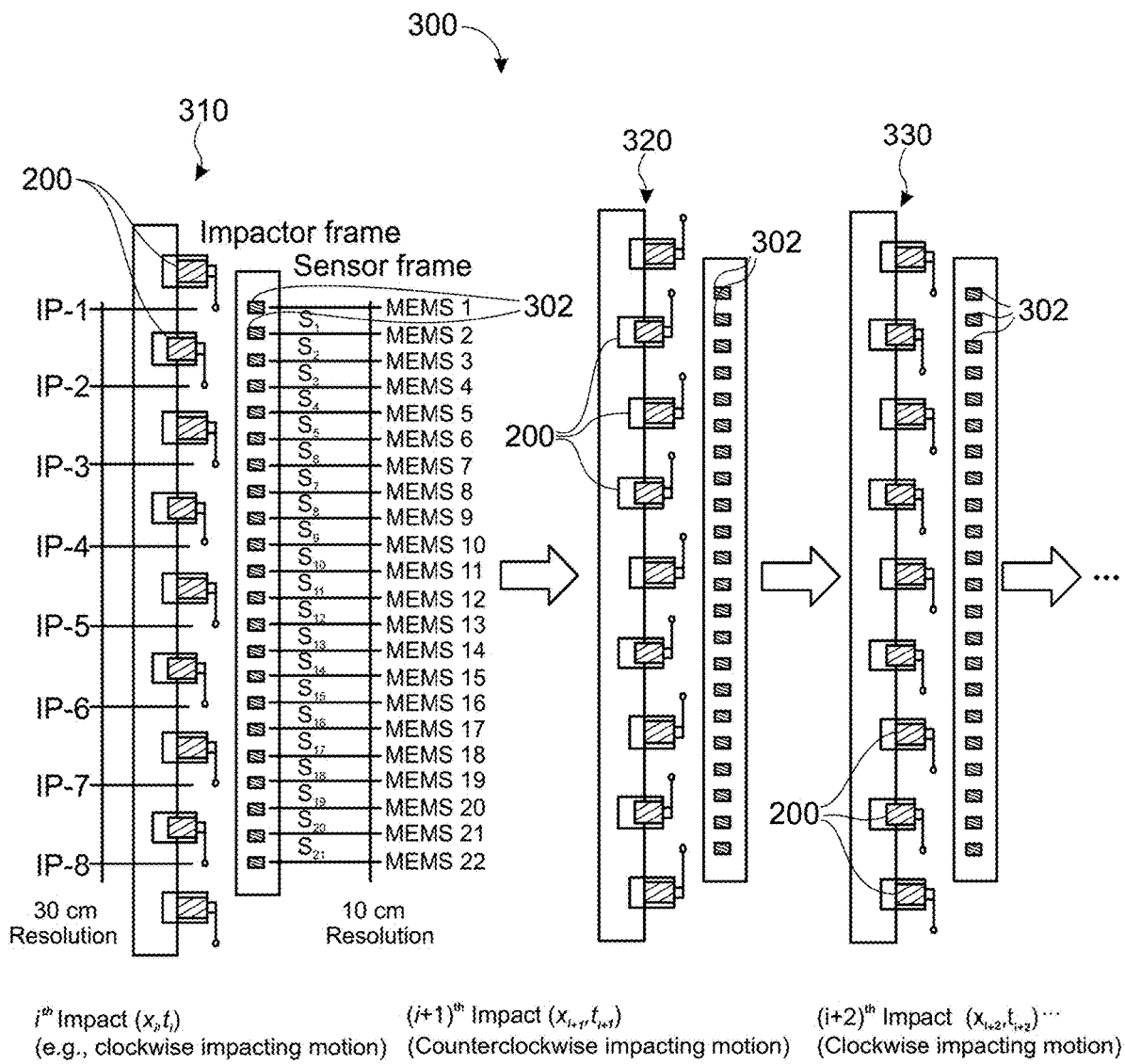
FIG. 3 is a schematic layout of an integrated rapid infrastructure monitoring system showing multichannel acoustic scanning with three consecutive impacts, in accordance with an exemplary embodiment of the invention.

FIG. 3 is a schematic layout 300 of an integrated rapid infrastructure monitoring system 100 showing a multichannel acoustic scanning (MAS) unit 300 during three consecutive impacts 310, 320, 330, in accordance with an exemplary embodiment of the invention. In an embodiment of the invention, the DSBI system 200 provides high incident wave energy and/or generates constant and high PRF mechanical waves, for example, at least 2-4 times what is typically generated by a single sided bounce system. In an embodiment of the invention, a MAS unit 300 is deployed which combines multiple DSBI systems and MEMS sensors. The exemplary MAS unit 300 includes 9 DSBI systems 200 and 22 MEMS sensors 302 with 30 cm and 10 cm spaces between them, respectively. It should be understood that more or less DSBI systems 200 and/or more or less MEMS sensors 302 could be used in the MAS unit 300.

In an embodiment of the invention, each DSBI system 200 operates with 20-millisecond time intervals to avoid wave interference by the simultaneous impact. In some embodiments, at least one of the plurality of DSBI systems 200 is designed to avoid motion path interference with any adjacent DSBI systems 200/impactors 202, for example, the DSBI systems 200 being alternatively offset from each other, such as shown in FIG. 3, where every other DSBI system 200 is set forward or back from the next.

The three consecutive impacts 310, 320, 330 shown in FIG. 3 can be defined $(x_i, t_i)$, $(x_{i+1}, t_{i+1})$, and $(x_{i+2}, t_{i+2})$ by time (t) and distance (x) with the impact number (i). The impacting points (IPs) are located at MEMS 1, 4, 7, 10, 13, 16, 19, and 22. $s_m$ is the section between $m^{th}$ MEMS and $(m+1)^{th}$ MEMS. The distance and range of the impact point and sections, IP and s, facilitate determining the resolution of the final result maps (exemplars of which are shown with respect to the Example, below) for detecting the delamination and vertical crack.

The resolution in longitudinal direction depends at least partly on the impact location, which is determined by vehicle speed (the ACE system 100 is towed and/or carried by a vehicle, in an embodiment of the invention) and PRF. The pulse repetition time of the developed DSBI system 200 is 400-milliseconds, in some embodiments of the invention. It should be understood that the PRF could be more or less. The 9-DSBI, MAS system 300 shown in FIG. 3 with a 20-millisecond delay, provides 20 impacts per second. The ACE system 100 can provide an even faster rate with an additional MAS unit installed in parallel, generating a mechanical wave every 200-milliseconds, which is similar to PRF of low-frequency ultrasonic transducers (40 impacts per second by the 18-DSBI system). The number of MAS units is scalable upwards, in some embodiments of the invention.

Figure 4:
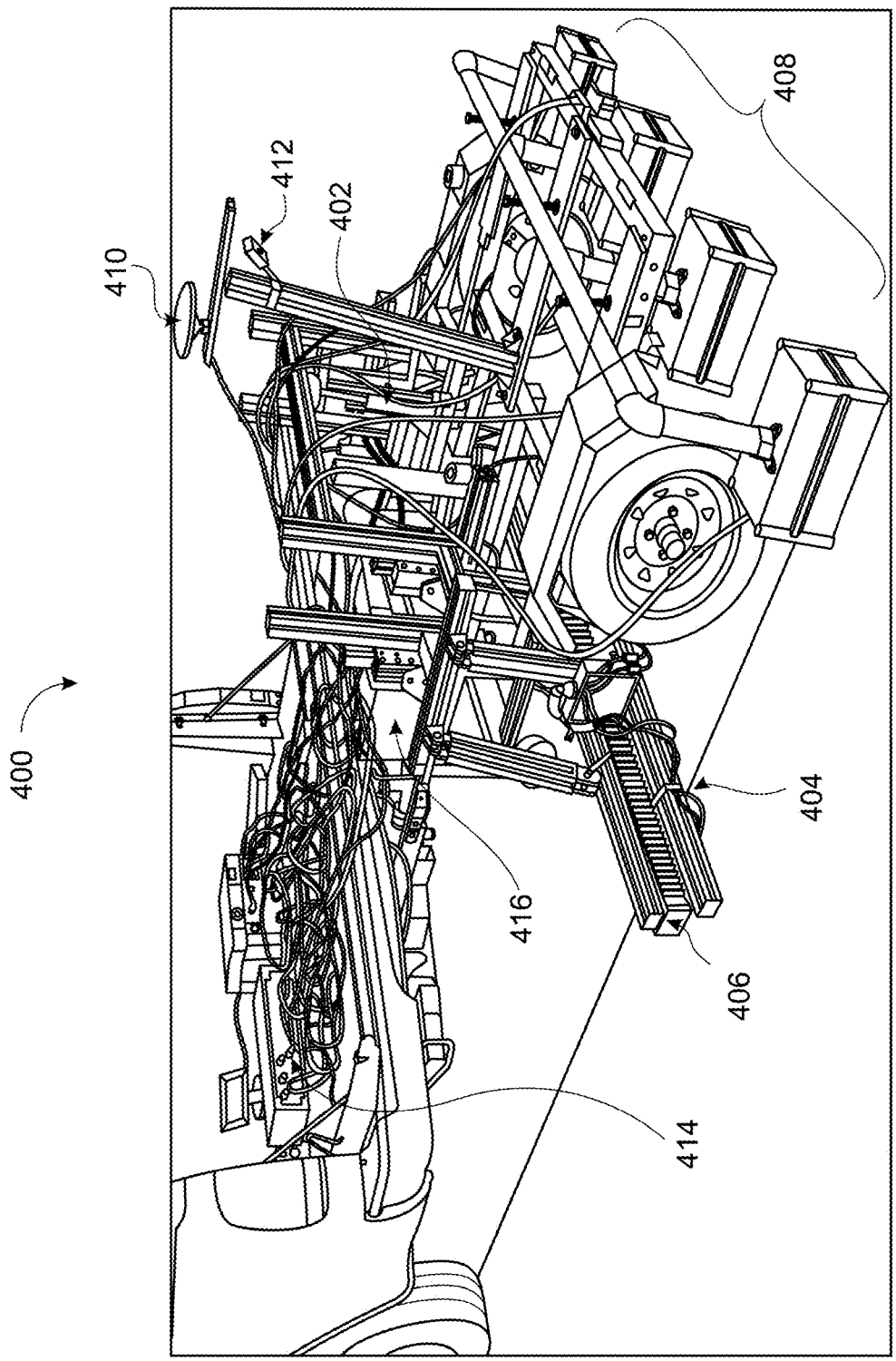
FIG. 4 shows an automated height adjustable scanning platform including mechanical wave, electromagnetic wave, video image, and position data collection capability, in accordance with an exemplary embodiment of the invention.

FIG. 4 shows an automated height adjustable scanning (AHAS) platform 400, usable as the integrated scanning platform 106 in an embodiment of the invention, including at least one of mechanical wave (DSBI), acoustic scanning (MEMS), electromagnetic wave (GPR), video image, and/or position data (GPS) collection capability, in accordance with an exemplary embodiment of the invention. The adjustable scanning-height design allows a nonstop, rapid traffic (e.g. up to or exceeding highway speeds) operation of the ACE system 100 by being carried on and/or being towed behind a vehicle, including multiple scanning paths or lanes for rapid and traffic-disruption-free inspection of infrastructure, for example, a roadway or bridge. In an embodiment of the invention, the AHAS platform 400 comprises a frame elevation system 402, a MAS unit 300 (including at least one impactor frame 404 and at least one sensor frame 406), optionally at least one GPR antenna 408, optionally at least one GPS antenna 410, at least one image sensor 412 (e.g. a video camera), at least one encoder, a controller/processor 414 and/or a control box 416 (for example, for the controlling operation of the AHAS or one or more of the components included thereon and/or comprising the ACES System 100).

Figure 5:
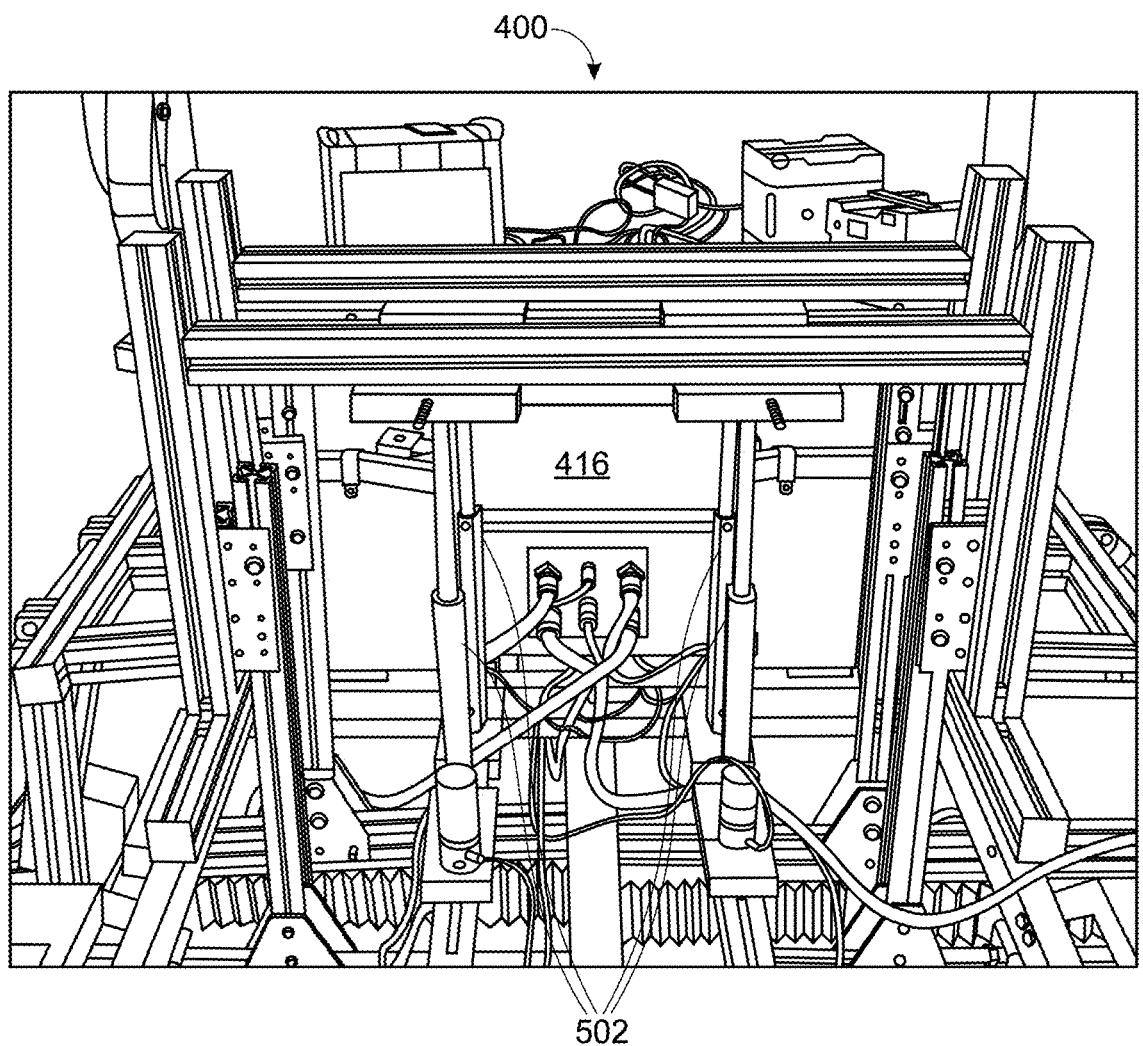
FIG. 5 is a perspective view of an automated height adjustable scanning platform, in accordance with an exemplary embodiment of the invention.
Figures 7A, 7B:
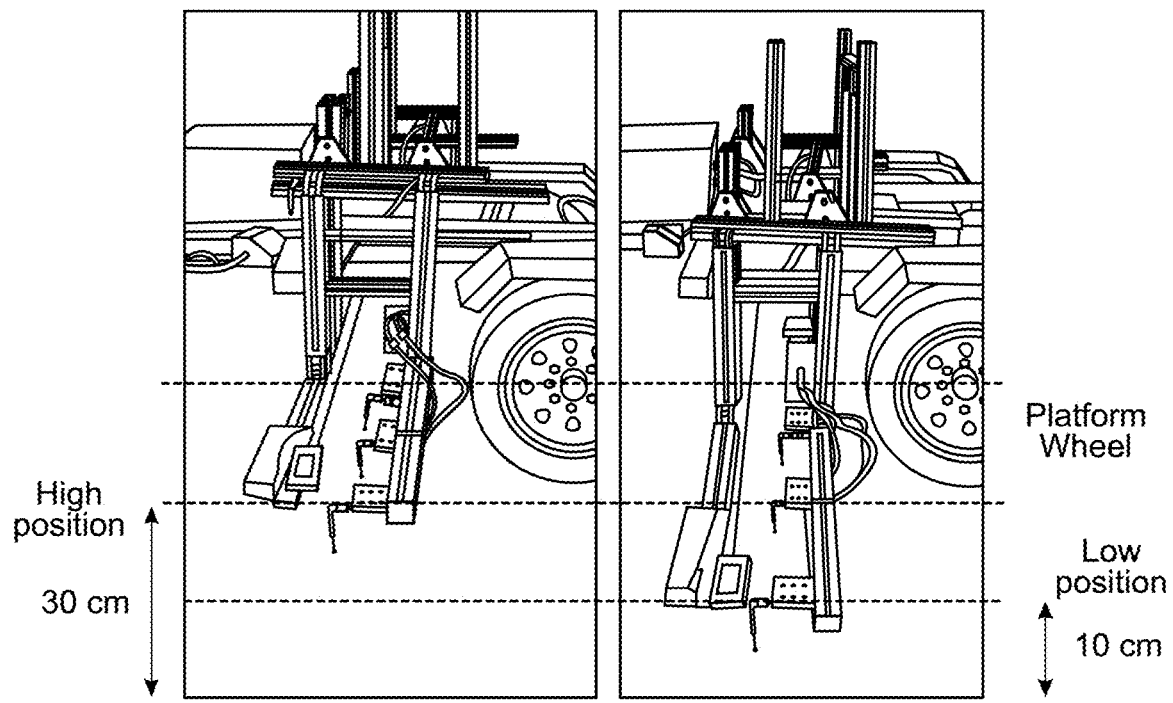
FIGS. 7A-7B are side perspective views of an automated height adjustable scanning platform raised and lowered, respectively, in accordance with an exemplary embodiment of the invention.

FIG. 5 is a perspective view of the automated height adjustable scanning platform 400, in accordance with an exemplary embodiment of the invention. In an embodiment of the invention, the AHAS platform 400 comprises of four linear actuators 502 for raising and/or lowering the AHAS platform 400 during operation. It should be understood that there could be more or less linear actuators. In an embodiment of the invention, the linear actuators 502 have a 20 cm stroke length and 1 cm/s increase speed. FIGS. 7A and 7B show the AHAS platform 400 in a high and low-level position, respectively. The height-adjustable frame 400 is designed to avoid damage to elements of the ACE System 100 by bumping into the underlying surface 210 and/or other structures (e.g., bridge deck, ground, median strip, sidewalk) during the inspection.

Figures 6A, 6B, 6C:
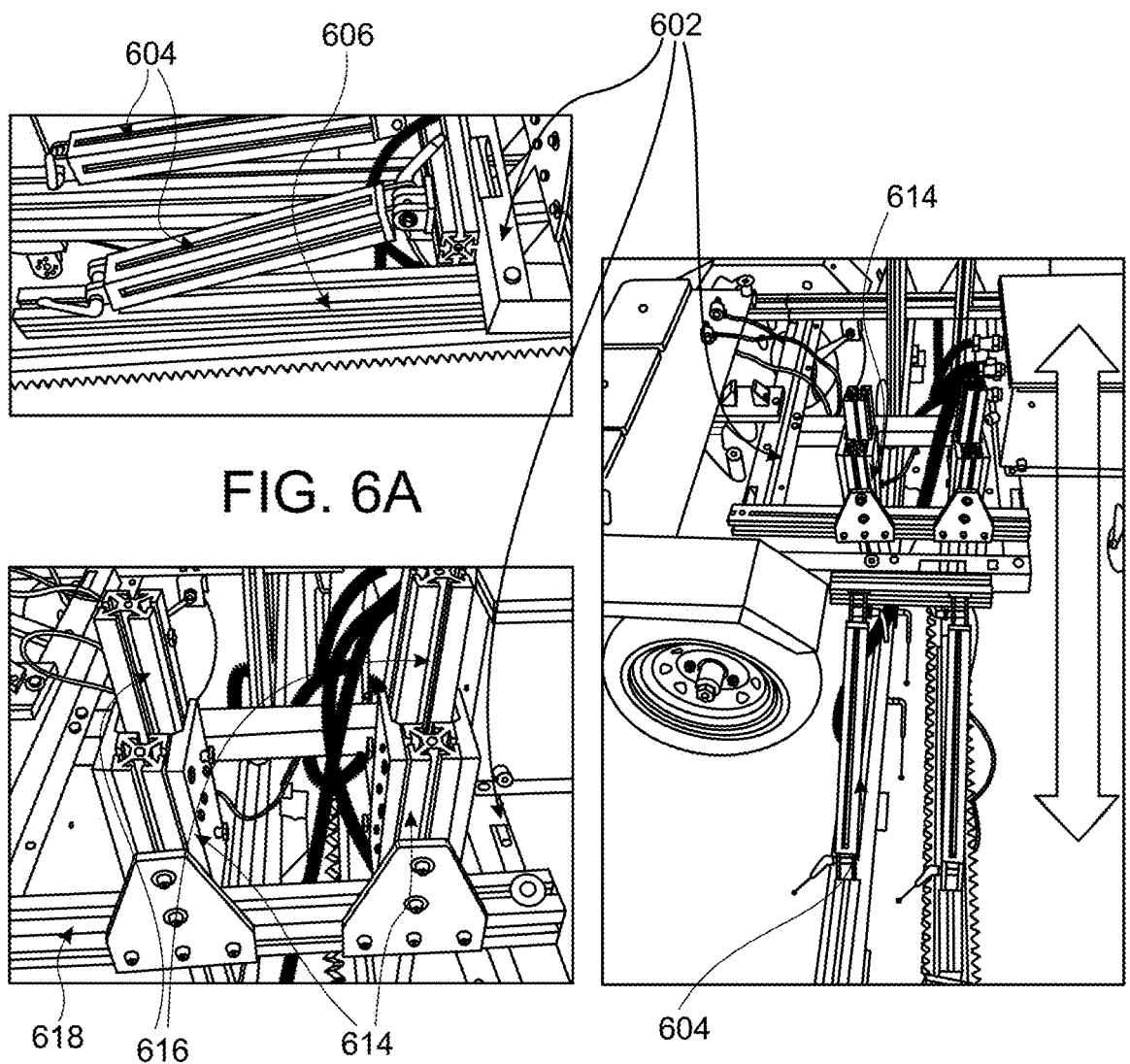
FIGS. 6A-6C are images of an automatic adjustable frame system, in accordance with an exemplary embodiment of the invention.

FIGS. 6A-6C are images of the AHAS platform 400 system, in accordance with an exemplary embodiment of the invention. FIG. 6A shows an embodiment with a frame 602 operatively connected to diagonal frame elements 604 which, when the diagonal frame elements 604 are actuated (by at least one actuator, not shown) cause the frame 602 to raise or lower as the diagonal frame elements move along a track 606. FIG. 6B shows an embodiment with the frame 602 operatively connected to vertical frame elements 614 which, when actuated by actuators 502, cause the frame to raise or lower as the vertical frame elements 614 move vertically along a track 616. Optionally, the vertical frame elements 614 are also movable horizontally on a horizontal track 618.

In some embodiments, such as shown in FIG. 6C, both diagonal frame elements 604 and vertical frame elements 614 are used in combination, with one or both being actuated (for example by actuators 502). In an embodiment of the invention, actuation of the diagonal and/or vertical frame elements is in response to distance detection, detecting the distance, between the MAS unit 300, and its associated frames 404, 406, and the underlying surface being scanned, such as a bridge deck or a roadway. In an embodiment of the invention, a controller is included in the system 100 which, as a part of its operative tasks, automatically adjusts the height of the a MAS unit 300, by moving the frames 404, 406, based on sensed data from a distance sensor optionally in combination with an entered value for desired distance between the sensor array (and/or frame) and the underlying surface 210 being scanned. Optionally, a laser distance sensor is used for this purpose.

In some embodiments of the invention, the system 500 is controlled by a software-programmed controller, such as described elsewhere herein.

FIGS. 7A-7B are side perspective views of an automated height adjustable scanning platform 400 raised and lowered, respectively, in accordance with an exemplary embodiment of the invention. It should also be understood that various structures of the ACE System 100 can be configured to be foldable or contractible in order to save space during transport, storage, or even during use, for example, when not all of the sensing systems available need to be utilized.

Figure 8:
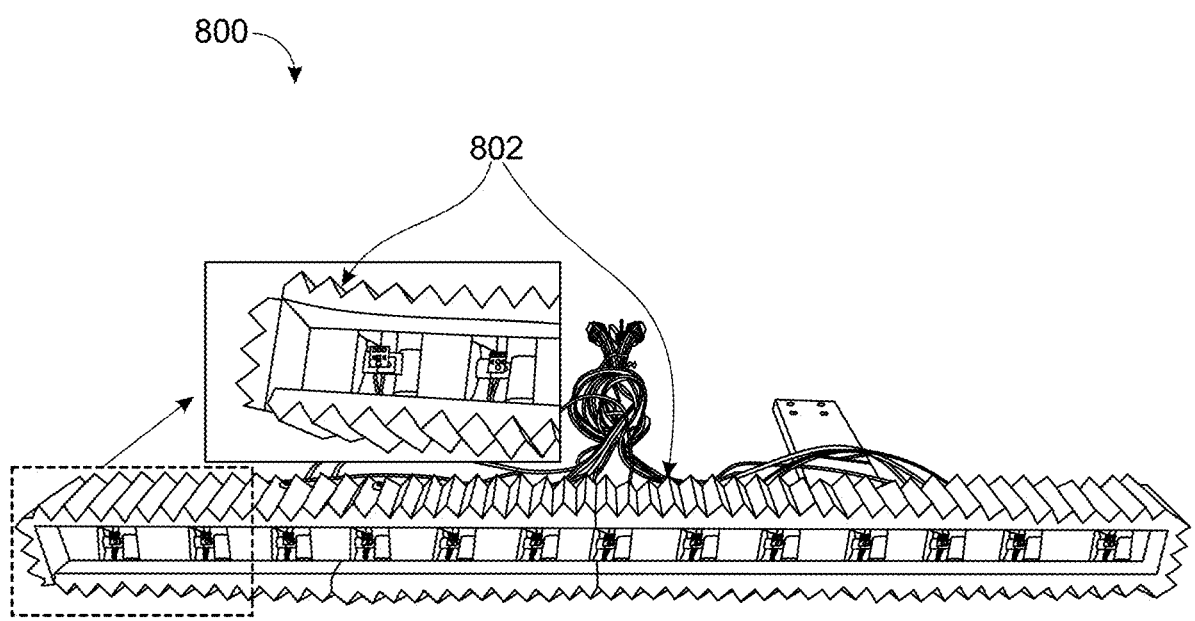
FIG. 8 is top perspective view of a multichannel acoustic scanning array with sound insulation, in accordance with an exemplary embodiment of the invention.

FIG. 8 is top perspective view of a multichannel acoustic scanning array 800, comprising a plurality of MEMS sensors 302 with sound insulation 802, in accordance with an exemplary embodiment of the invention. In an embodiment of the invention, the sound insulation 802 reduces noise generated by traffic and/or a vehicle towing or bearing the ACE system 100 so that sensing of impacts on the underlying surface by the multichannel acoustic scanning array 800 of the at least one impactor 202 (for example, as employed in a DSBI) is performed at higher quality and/or clarity.

Figure 9:
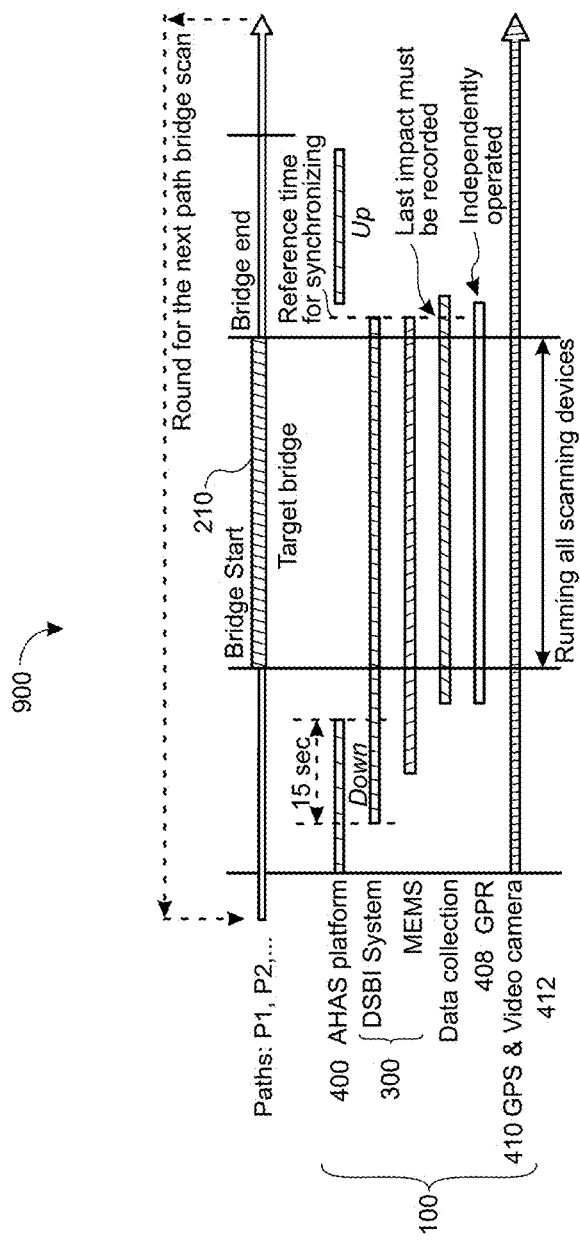
FIG. 9 is a timeline of an infrastructure scanning procedure for various components of an integrated rapid infrastructure monitoring system, in accordance with an exemplary embodiment of the invention.

FIG. 9 is a timeline 900 of an infrastructure scanning procedure for various components of the ACES system 100, in accordance with an exemplary embodiment of the invention. In an embodiment of the invention, the AHAS platform 400 remotely controls the MAS unit 300 level to a lower position (for example, as shown in FIG. 7B) while the ACE system 100 approaches the bridge (or other infrastructure, as the underlying surface 210) starting point. The low-level position provides a proper lift-off distance between the DSBI system 200 and the bridge deck surface to generate a mechanical wave. In an embodiment of the invention, the DSBI system 200 also starts impacting while the MAS unit 300 is lowered to the scanning level (about 10 cm, in some embodiments). Thus, the ACE system 100 allows for continuous movement and rapid inspection without preparation time. After the MAS unit 300 reaches the lower position, some or all of the scanning and scanning-related devices (e.g., MEMS sensors 302, GPR 408, GPS 410, encoders, and video 412) start collecting data. When the ACE system 100 passes the end of the bridge 210, at least one of the DSBI, MEMS sensors, encoders, and GPR turn off. The AHAS platform 400 optionally lifts the MAS unit 300 after the scanning devices stop recording data. The ACE system 100 proceeds to inspect the next lane, if necessary. In an embodiment of the invention, the GPS and video camera run the entire inspection time without interruption. Optionally, one or both run less than the entire time.

Figure 10:
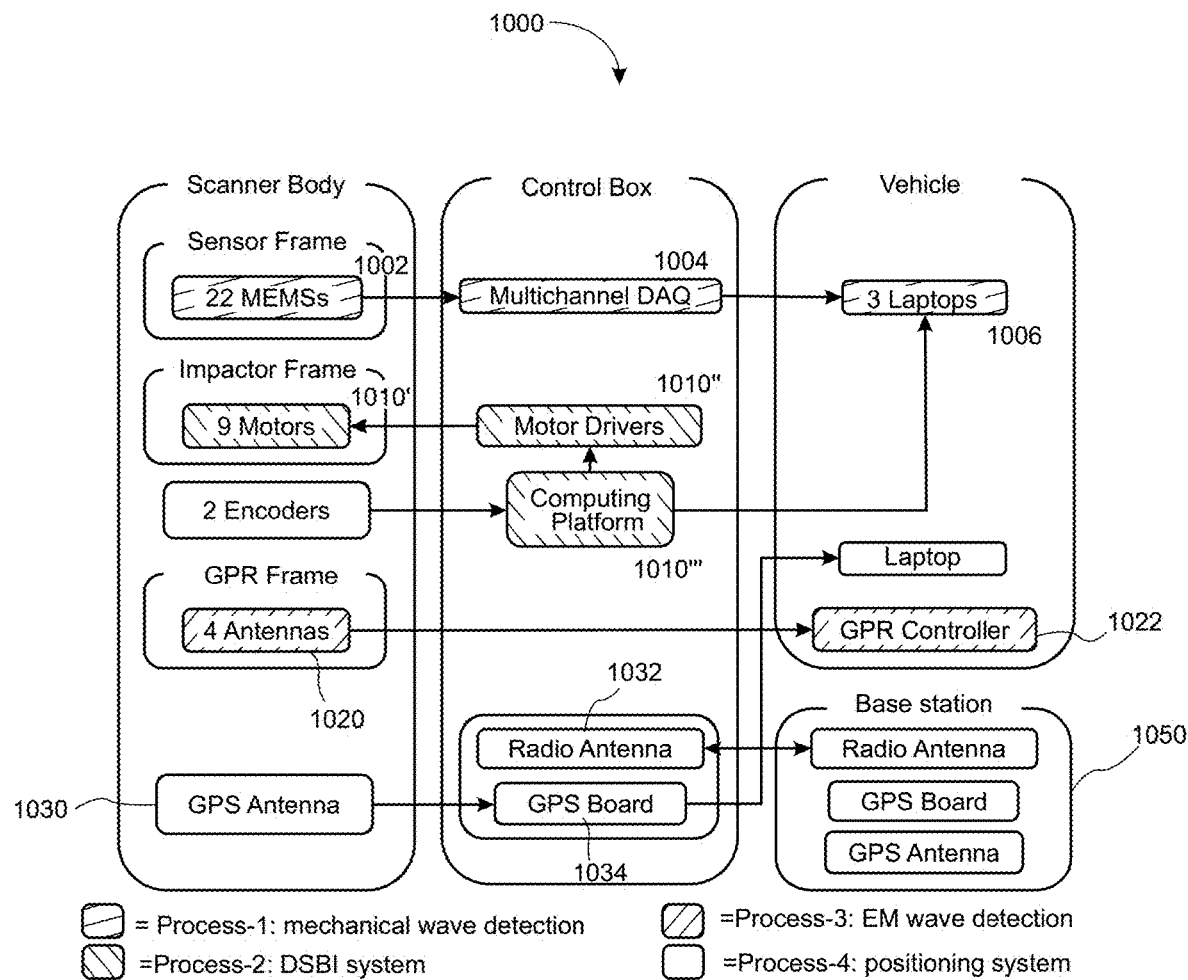
FIG. 10 is a block diagram of an exemplary configuration of an integrated rapid infrastructure monitoring system, in accordance with an exemplary embodiment of the invention.

FIG. 10 is a block diagram of an exemplary configuration of an integrated rapid infrastructure monitoring system 1000 (system 1000 is an exemplary embodiment of an ACE system 100), in accordance with an exemplary embodiment of the invention. In an embodiment of the invention, the multiple processes of the integrated rapid infrastructure monitoring system 1000 are classified by functions and/or purposes such as signal obtaining/generating and scan positioning. In detail, Process-1 comprises at least one MEMS sensor 1002, data acquisition hardware (DAQ) 1004, and at least one laptop 1006 to measure the mechanical wave generated by the DSBI system 1010 impacting the bridge deck. Process-2 comprises the DSBI system 1010 including motor 1010', motor drive 1010'', and computing platform 1010''' to generate the mechanical wave on the bridge deck. Process-3 comprises at least one GPR antenna 1020 and at least one controller 1022 to collect the EM waves. Process-4 comprises at least one GPS 1030 and radio antenna 1032, GPS board 1034, encoder 1036, computing platform 1038, and laptop 1040 to record the position of the integrated rapid infrastructure monitoring system 1000. Real-time kinematic (RTK) GPS provides a centimeter-level accuracy by correcting the position with the reference from the base station 1050.

Figure 11:
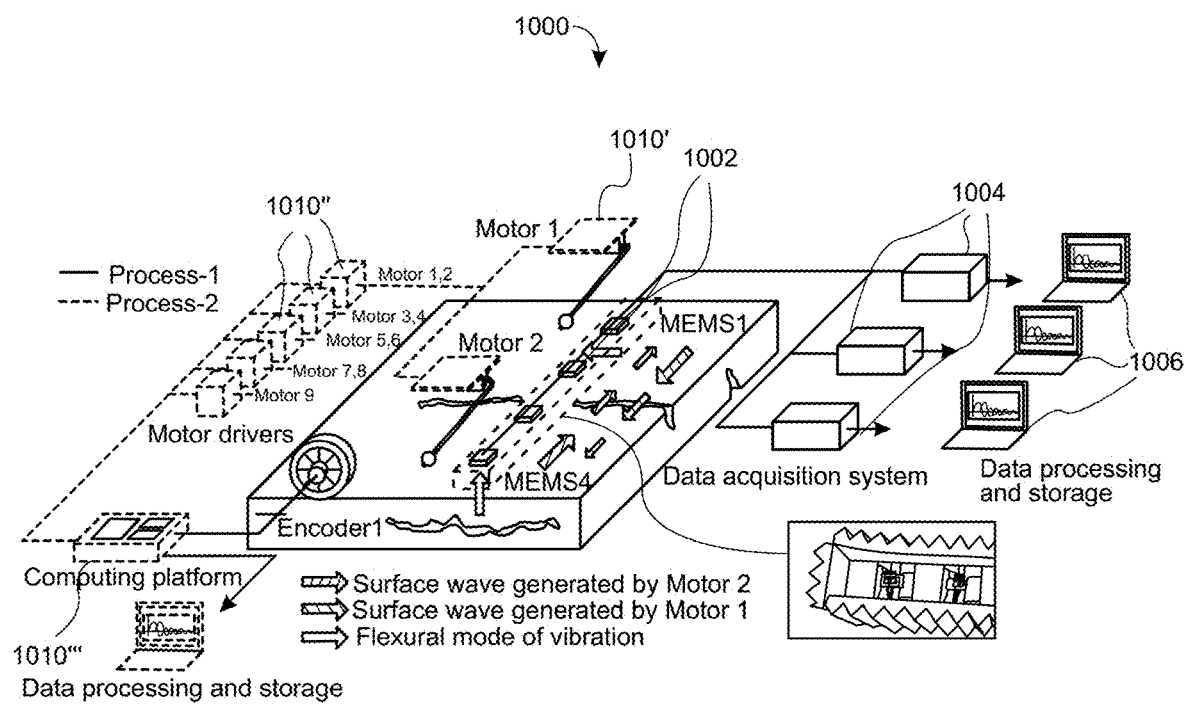
FIG. 11 is a schematic diagram of an exemplary configuration of an integrated rapid infrastructure monitoring system in operation, in accordance with an exemplary embodiment of the invention.

FIG. 11 is a schematic diagram of the integrated rapid infrastructure monitoring system 1000 in operation, in accordance with an exemplary embodiment of the invention.

The configuration of integrated rapid infrastructure monitoring system 1000 illustrates an exemplary detailed operation of Process 1 and 2 (MEMS sensor and DSBI, shown in FIG. 10) for detecting delamination and vertical cracks in the scanned infrastructure. In the embodiment shown, twenty-two noncontact MEMS sensors 1002 are placed in sound insulation forms (such as shown in FIG. 8) to minimize or prevent wholly external direct acoustic waves and noises. In addition, the sound insulation is placed between the bottom surface of the sensor frame 406 and MEMS sensors to reduce any unexpected vibrations transferred from the various frames used in the system, for example, the AHAS platform 400 itself, the at least one impactor frame 404 and the at least one sensor frame 406. The arrows shown in FIG. 11 indicate the direction of the obtained mechanical waves for infrastructure damage/crack detection. For example, the arrows illustrate surface wave propagation. The arrow pointing directly upwardly represents the mechanical wave generated by the DSBI to obtain the flexural mode over the delamination area.

Figure 12:
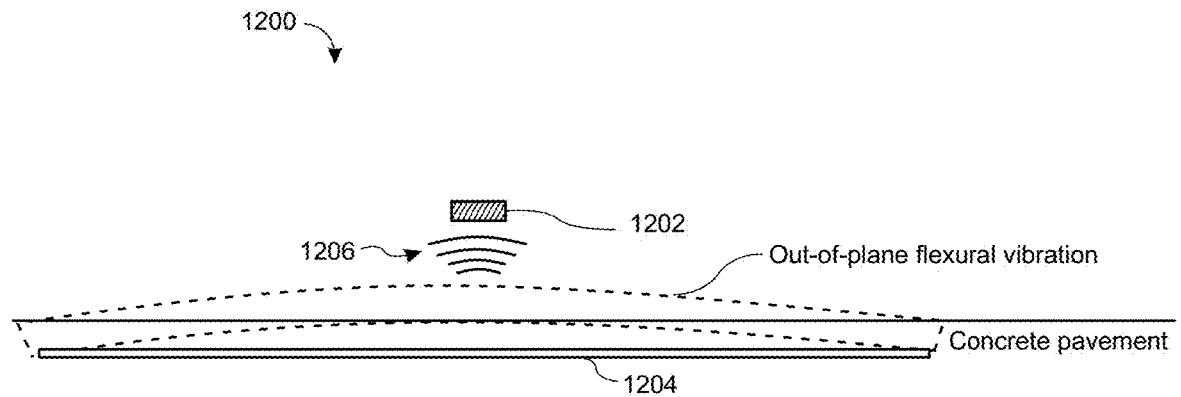
FIG. 12 is a schematic of using an air-coupled MEMS sensor detecting flexural vibration to identify delamination, in accordance with an exemplary embodiment of the invention.

FIG. 12 is a schematic 1200 of using an air-coupled MEMS sensor 1202 detecting flexural vibration 1206 to identify delamination 1204, in accordance with an exemplary embodiment of the invention. Exemplary damage identification processes for monitoring delamination, vertical crack, and corroded reinforcement detection are described hereinbelow. MAS unit 300 based and GPR 408 based scans are addressed with a fundamental approach and a post-processing procedure, in an embodiment of the invention. The process includes the post-processing procedure, details of data status (e.g., size or format), parameters (e.g., cutoff frequency, processed target range), and expected outputs. The MAS unit 300 based approach optionally includes impact-echo and/or wave attenuation techniques to identify the delamination and vertical crack.

Generally, the impact-echo test has two different families of frequency modes: the thickness and the flexural vibration modes. The thickness mode ($f_{TM}$) is dominant when body waves are repetitively reflected between the two parallel boundaries. The thickness mode is commonly used to estimate the thickness of the medium with known longitudinal wave velocity. The thickness mode of frequency in a typical concrete bridge deck (h=0.18 m, $C_L$=4000 m/s, and $\beta_1$=0.95) is near 10 kHz. On the other hand, the flexural vibration mode can present the delamination since it occurs by the out-of-plane vibration of the concrete above a delamination. The flexural vibration mode for detecting delamination implements the impact-echo test, the schematic of which is shown in FIG. 12, in an embodiment of the invention. In the MAS unit 300, multiple noncontact MEMS sensors 1202 are used to collect the leaky-wave signals.

Figure 23A:
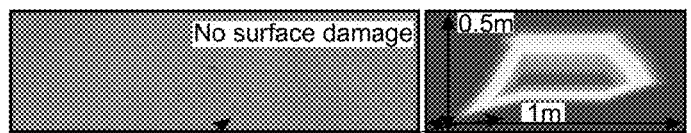
FIG. 23A is a 2-D energy intensity colormap, in accordance with an exemplary embodiment of the invention.

The details of the flexural vibration mode can be explained by the fundamental flexural vibration mode equation ($f_{FM}$):

$$f_{FM} = \frac{k_{DF}^2 \pi}{2h^2} \sqrt{\frac{D}{\rho h}}, \quad (1)$$

where $k_{DF}$ is a dimensionless frequency which is determined from the general natural frequencies in terms of the width-to-depth ratio of delamination; h is a depth of delamination; D is flexural rigidity, $D=Eh^3/12(1-v^2)$, with Young's modulus (E) and Poisson's ratio (v); $\rho$ is material density. Based on equation (1), the flexural vibration mode depends on the geometrical property of $k_{DF}$ and h by given material properties. Thus, the shape of delamination (e.g., width, depth) facilitates the determination the frequency of the flexural vibration mode. Due to the unknown geometry of delamination, many in the art would use a sum of spectral magnitude, or energy intensity, in a different range (e.g., 1.5 to 3 kHz (Hendricks et al. 2020), 1 to 4 kHz. However, the currently described process measures the flexural vibration mode by calculating the energy intensity 1 kHz to 6 kHz frequency range. The energy intensity (EI) can be expressed as, $$EI_n(f) = \int_{f_l}^{f_h} \Psi_n(f) df = \Sigma_{i=1}^{N} \Psi_n(f_i), (f_1 = f_l, f_N = f_h), \quad (2)$$

where $EI_n(f)$ is energy intensity of $n^{th}$ MEMS sensor; $\Psi_n(f)$ is the spectral energy density of $n^{th}$ MEMS sensor, $\Psi_n(f) = |X_n(f)|^2$, with a magnitude of the frequency component ($X_n(f)$); $f_l$ and $f_h$ are the low and high-boundary frequency (i.e., 1 kHz and 6 kHz in our system). The obtained EI related to flexural vibration mode is processed to create a two-dimensional (2-D) scanning image, or 2-D colormap, presenting delamination. The 2-D colormap is obtained by interpolating the 2-D matrix (obtained EIs) in a spatial meshed grid by x and IP. FIG. 23A, described below, is representative of a 2-D colormap obtained using Eq. (2). All-post-processing can be performed with MATLAB mathematical computing software (MathWorks, Natick, Mass., USA) or other suitable software.

Figure 13:
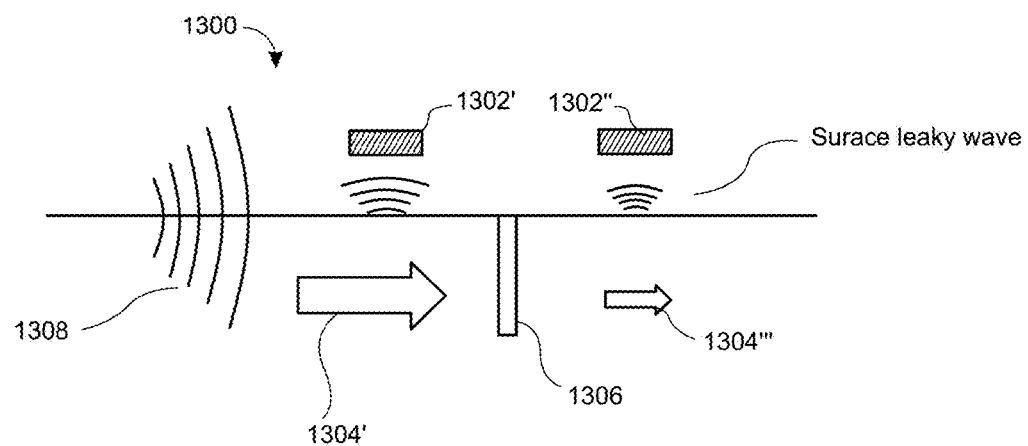
FIG. 13 is a schematic of wave energy attenuation in multi-sensor-based surface wave detection, in accordance with an exemplary embodiment of the invention.

FIG. 13 is a schematic 1300 of detecting wave energy attenuation 1304 using the ACE system 100, in accordance with an exemplary embodiment of the invention. Using a MAS unit 300 scan allows for sensing wave attenuation for vertical crack 1306 detection, in an embodiment of the invention. Generally, wave attenuation causes signal amplitude to become lower when traveling through the medium with damage (e.g., vertical cracks 1306). In an embodiment of the invention, the surface wave attenuation is obtained from multiple receivers by calculating the wave energy difference between two adjacent receivers 1302', 1302", such as shown in FIG. 13. The ACE system 1300 shown in FIG. 13 uses multiple MEMS sensors 1302', ii, n, to detect the attenuated surface waves 1304" which are resultant from a crack in the scanned infrastructure, such as a bridge deck.

In an embodiment of the invention, the attenuated wave 1304" is calculated from the difference in wave energies detected by adjacent MEMS sensors between the original, un-attenuated wave 1304' and the attenuated wave 1304". Within the time window, the wave energy of $n^{th}$ MEMS ($E_n$) can be expressed as, $$E_n(T) = \int_{T_s}^{T_e} w_n(T)^2 dT = \sum_{i=1}^{N} w_n(T_i), \quad (3)$$

$$(T_1 = T_s, T_N = T_e)$$

where $w_n(t)$ is obtained signal from $n^{th}$ MEMS across concrete; $T_s$ and $T_e$ are start and end of the time window. In an embodiment of the invention, the wave energy is calculated with a time window (~0.3-millisecond) to detect only mechanical wave energy dominating before the direct acoustic wave 1308 arrival from the impact point (0.35 millisecond). The attenuated wave energy can be expressed by the percentage decrease between two energies calculated from two adjacent MEMS sensors 1302', 1302": $E_{n1}$ represents the wave energy of the $n1^{th}$ MEMS sensor from the impacting point; $E_{n2}$ represents the wave energy of the $n2^{th}$ MEMS sensor from the impacting point. The n1 MEMS should be closer to the IP than n2 to obtain the positive energy loss (EL) value. The attenuated wave energy ($EL_{n1\text{-}n2}$) is expressed, $$EL_{n1\text{-}n2}=(E_{n1}-E_{n2})/E_{n1}\times 100 \qquad (4)$$

The obtained wave energy will be processed to a 2-D colormap, presenting the vertical cracks. A post-processing algorithm, according to an embodiment of the invention is presented in the flowchart, as depicted in FIG. 14, below.

Data collection and storage is optionally processed by the LabView software (National Instruments, Austin, Tex., USA) or other similarly functioning software. In an embodiment of the invention, data collection is performed with a 0.5 M/s sampling rate in "streaming" mode. The streaming mode records and transfers data to a computer in real-time. In an exemplary embodiment, such as shown in FIG. 13, the obtained data from three DAQs are combined into one matrix (inspection time×22-channel output). In an embodiment of the invention, the post-processing for the delamination detection is conducted with the wave response obtained from MEMS sensors at the f (i.e., MEMS 1, 4, 7, 10, 13, 16, 19, and 22 in FIG. 3), which is placed at the closest location from the impacting point, IP. For vertical crack detection, wave responses from all MEMS sensors are used, in some embodiments of the invention. Ultimately, the identified delamination areas are presented on a 2-D colormap by calculating the sum of power spectrum as the band energy (1 kHz to 6 kHz band) as described with respect to FIG. 12. The 2-D colormap of vertical crack detection is presented from the data set of the calculated wave attenuation of each section, $s_1$ to $s_{21}$ in FIG. 3.

Figure 14:
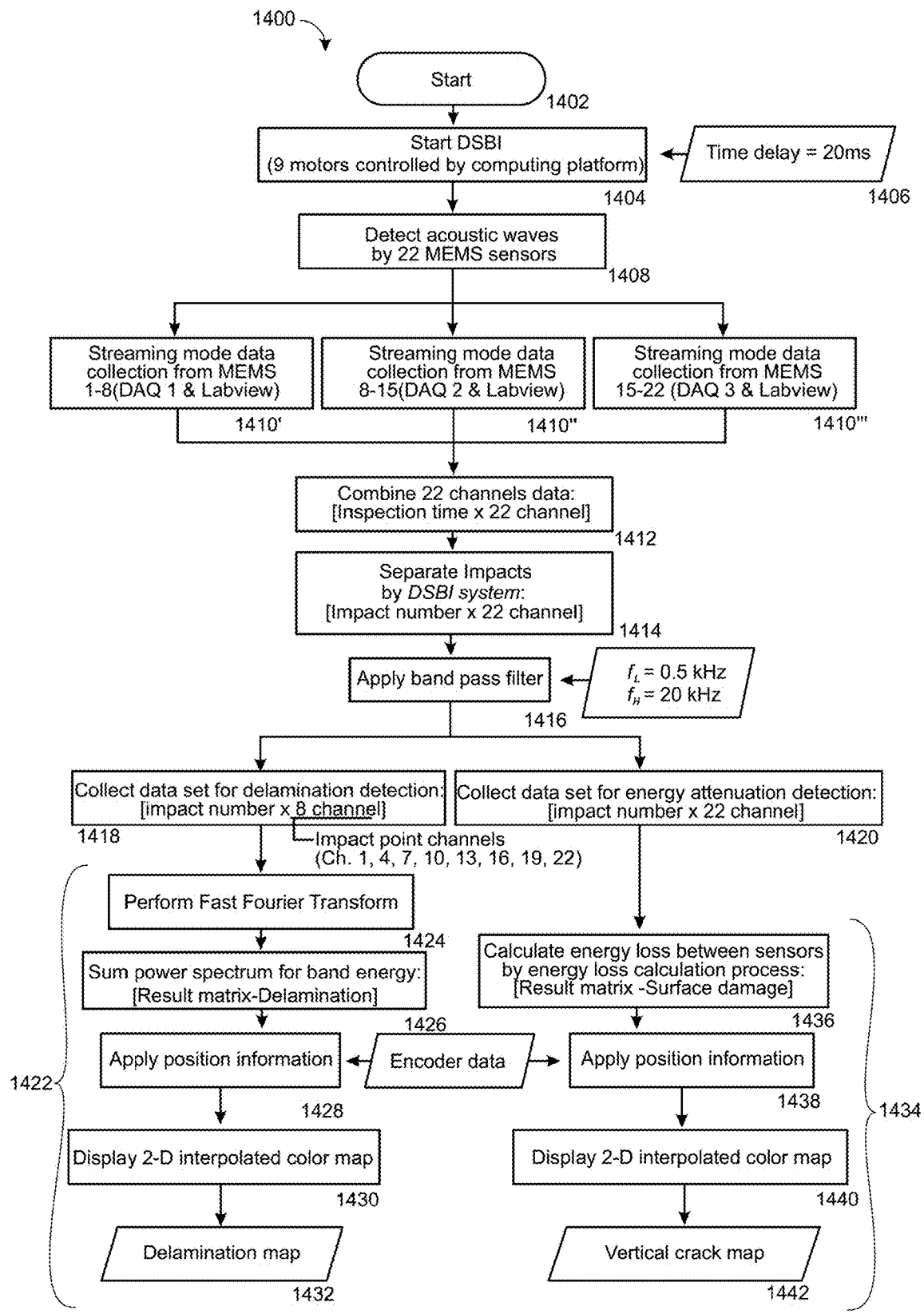
FIG. 14 is a flowchart of mechanical wave-based damage detection of an integrated rapid infrastructure monitoring system, in accordance with an exemplary embodiment of the invention.

FIG. 14 is a flowchart 1400 of mechanical wave-based damage detection method using the integrated rapid infrastructure monitoring system 1000, in accordance with an exemplary embodiment of the invention. In an embodiment of the invention, the process demonstrated by the flowchart 1400 illustrates obtaining mechanical waves which are processed to present a delamination map and a vertical crack map. It should be understood that flowchart 1400 corresponds to the specific embodiment shown in FIGS. 10 and 11, however, other configurations (e.g. more or less impactors, more or less MEMS sensors, more or less DAQs, more or less computers) could be used with a substantially similar or identical process flow as is shown.

As is described somewhat similarly in FIG. 9, the timing of the detection method involves a coordination of multiple sensing and other systems in the integrated rapid infrastructure monitoring system 1000. FIG. 14 starts 1402 where the DSBI system is activated 1404, optionally at a preset time delay 1406 (in this scenario, with a 20 ms delay), whereby when the impactors of the DSBI strike the underlying surface acoustic waves are generated. These acoustic waves are then detected 1408 by the MEMS sensors of the integrated rapid infrastructure monitoring system 1000. In the interests of processing speed and/or efficiency, the impacts sensed by the MEMS sensors are routed 1410', 1410", 1410''', to a plurality of DAQS for processing (in this scenario, three DAQs are shown, like in FIG. 11). From these different DAQs, a comprehensive data set is created through combining 1412 them from the DAQ output data.

The sensed impacts are processed 1414, for example including applying 1416 a band pass filter, and wherein the processed impact data is then separated into a data set for delamination detection 1418 and a data set for vertical crack detection 1420.

Additional processing 1422 optionally occurs for the delamination data set, including at least one step of performing a fast Fourier transform 1424, summing power spectrum for band energy 1426, applying position information from encoder data 1428, and creating/displaying a 2-D interpolated color map 1430, to generate 1432 a delamination map.

Additional processing 1434 optionally occurs for the vertical crack data set, including at least one step of calculating energy loss between MEMS sensors 1436, applying position information 1438, displaying a 2-D interpolated map 1440, and generating 1442 a vertical crack map.

Figure 15:
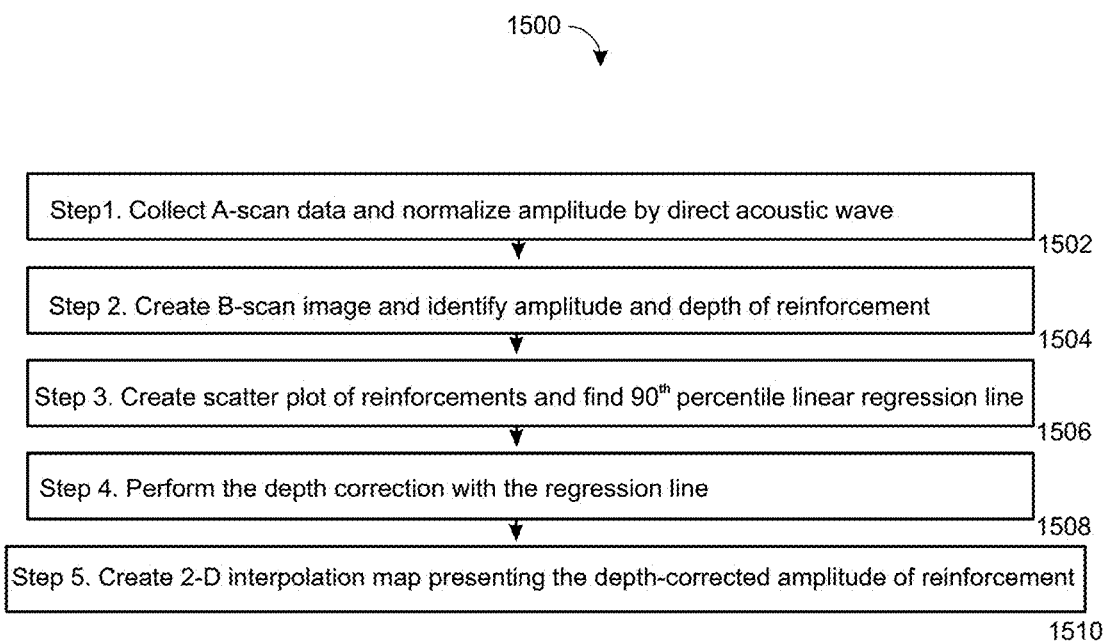
FIG. 15 is a flowchart of a method for detecting corroded reinforcement, in accordance with an exemplary embodiment of the invention.

FIG. 15 is a flowchart 1500 of a method for detecting corroded reinforcement, in accordance with an exemplary embodiment of the invention. In an embodiment of the invention, the intensity of a reflected GPR EM wave from the reinforcement structures within the infrastructure being scanned (e.g. within a bridge deck) and its arrival time presents the reinforcement condition/status. The depth of the reinforcement is obtained by using the two-way travel time (TWTT) of the EM wave generated by the GPR.

The collected EM wave is normalized 1502 by a direct coupling wave, in an embodiment of the invention. The direct coupling is the first pulse on the GPR signal. Since the direct coupling wave influences the entire wave response, the obtained wave amplitude is normalized by the direct coupling wave amplitude ($A_{dc}$). From the normalized A-scan data, the normalized peak amplitude of reinforcement reflection and TWTT of the peak point are obtained. The TWTT is converted to depth with the EM wave speed.

The obtained 1504 normalized amplitude and depth of the reinforcements are presented on a scatter plot to observe and show the relationships between the amplitude and depth. A $90^{th}$ percentile linear regression line is calculated 1506 from the scattered data to perform depth correction. The depth correction is performed 1508 to eliminate depth-dependent amplitude effects by subtracting the regression line from the amplitudes. Thus, the depth-corrected amplitude presents the reinforcement corrosion. The obtained depth-corrected amplitudes will be presented 1510 by a 2-D colormap, such as described with respect to FIG. 14 (delamination detection) and the Example.

Figure 16:
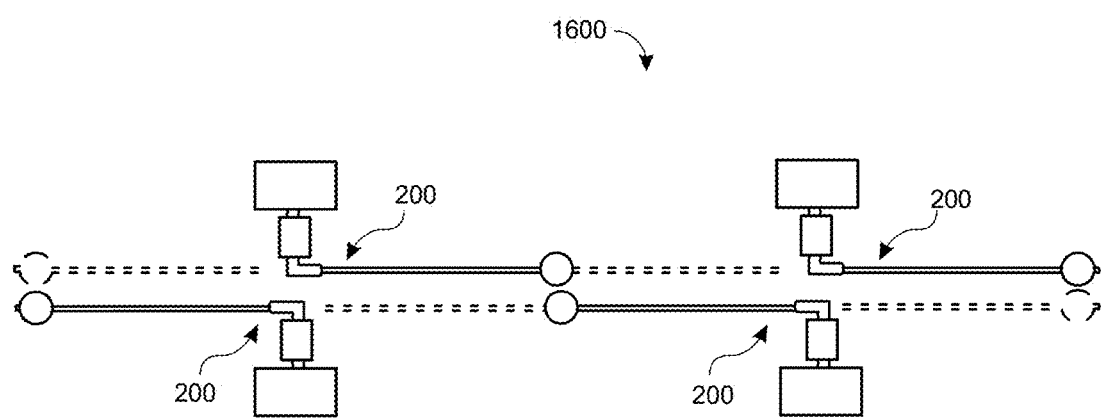
FIG. 16 is a schematic, top view showing a pluralized double-sided bounce impacting system, in accordance with an exemplary embodiment of the invention.

FIG. 16 is a schematic, top view showing a pluralized double-sided bounce impacting system 1600, in accordance with an exemplary embodiment of the invention. In an embodiment of the invention, the pluralized system 1600 comprises a plurality of double-sided bounce impact systems 200. Using a plurality of systems 200 provides an extremely high number of impacts to scan an underlying surface, such as road pavement or a bridge. In an embodiment of the invention, system 1600 provides 10 to 30 impacts per second, which allows for a 50 to 60 mph speed inspection environment. It should be recalled that one of the disadvantages of the current impact measurement systems is the extremely slow speed at which measurements must be taken, this problem being solved by using an impact system such as pluralized double-sided bounce impacting system 1600. Furthermore, with so many impacts measured, the scan can be of high quality as a result of the high resolution data provided by the massive amounts of impacts generated and then measured by system 1600. While system 1600 is arranged with alternating, facing impactors, virtually any pluralized arrangement of impactors is usable with the ACE system 100, with the understanding that generally speaking, more impactors provides a higher resolution result as long as their impact timing is carefully controlled.

Figure 17:
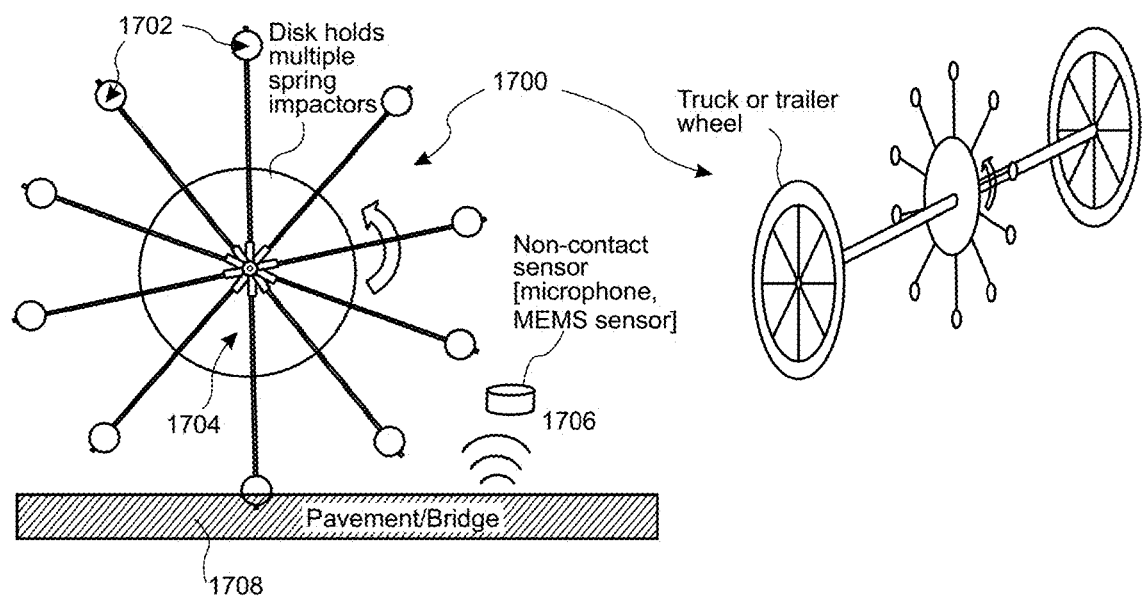
FIG. 17 is a schematic, side view of a circular rolling impact system, in accordance with an exemplary embodiment of the invention.

FIG. 17 is a schematic, side view of a circular rolling impact system 1700, in accordance with an exemplary embodiment of the invention. In an embodiment of the invention, at least one impactor 1702, optionally a plurality of impactors 1702, is spun about an axis of rotation (optionally an axis of a disk or wheel 1704), causing the one or more impactors 1702 to strike the underlying surface 1708 in sequence. It can be seen that the impactors rotate outside the maximum diameter of the wheel, when the wheel rotates around the axis of rotation, to enable the impactors to impact on the underlying surface during system 1700 operation.

In some embodiments of the invention, the axis of rotation (central rotational axis of the system 1700) is an axle of a vehicle on which the system 1700 is mounted, such that when the vehicle is in motion, the axle turns, thereby causing the at least one impactor 1202 to impact on the underlying surface on which the vehicle is traveling. In some embodiments of the invention, the impactors 1702 are connected to the wheel at or near the axis of the wheel 1704. The PRF can be increased or decreased, optionally by altering the speed of the spinning about the axis (i.e. by speeding up or slowing down the vehicle) and/or by increasing or reducing the number of impactors on the wheel 1704.

As with other embodiments described herein, at least one sensor 1706 is used to detect the impacts for data accumulation. In an embodiment of the invention, more than one wheel 1704 with at least one impactor 1702 is used in the system 1700.

Figure 18:
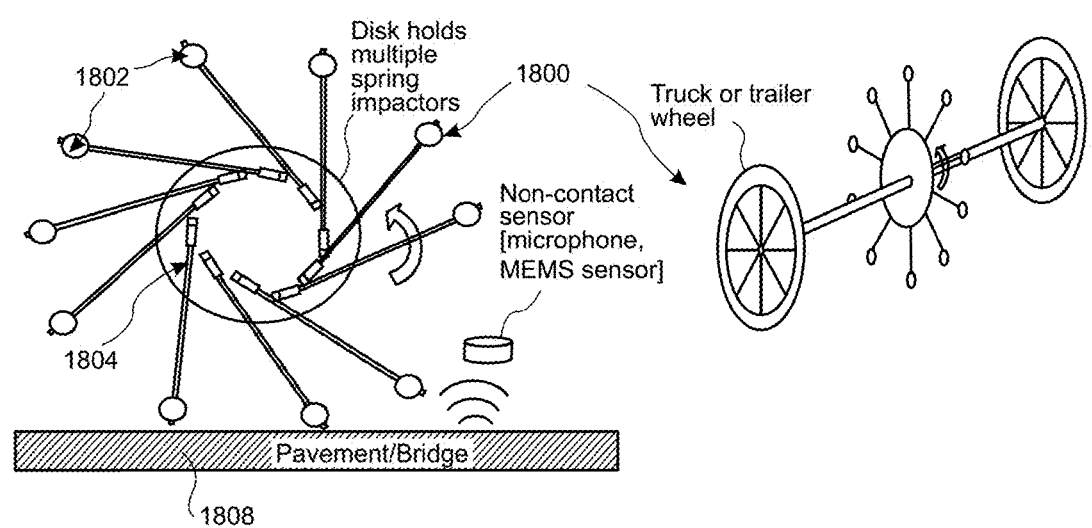
FIG. 18 is a schematic, side view of a spiral rolling impact system, in accordance with an exemplary embodiment of the invention.

FIG. 18 is a schematic, side view of a spiral rolling impact system 1800, in accordance with an exemplary embodiment of the invention. In an embodiment of the invention, system 1800 notably, but not exclusively, differs from system 1700 in the arrangement of the impactors 1802 on the wheel 1804, wherein the impactors 1802 are connected to the wheel 1804 in a circular pattern which causes a spiraling behavior of the impactors 1802 as the wheel 1804 is turned. Optionally there is only one impactor 1802 attached to the wheel 1804, rather than a plurality. It should be understood that impact rate on the underlying surface 1808 can also be adjusted by adding or removing impactors 1802 from the wheel and/or changing their configuration on the wheel 1804 (rather than, or in combination with, adjusting forward velocity of the system 1800). In an embodiment of the invention, more than one wheel 1804 with at least one impactor 1802 is used in the system 1800.

Figure 19:
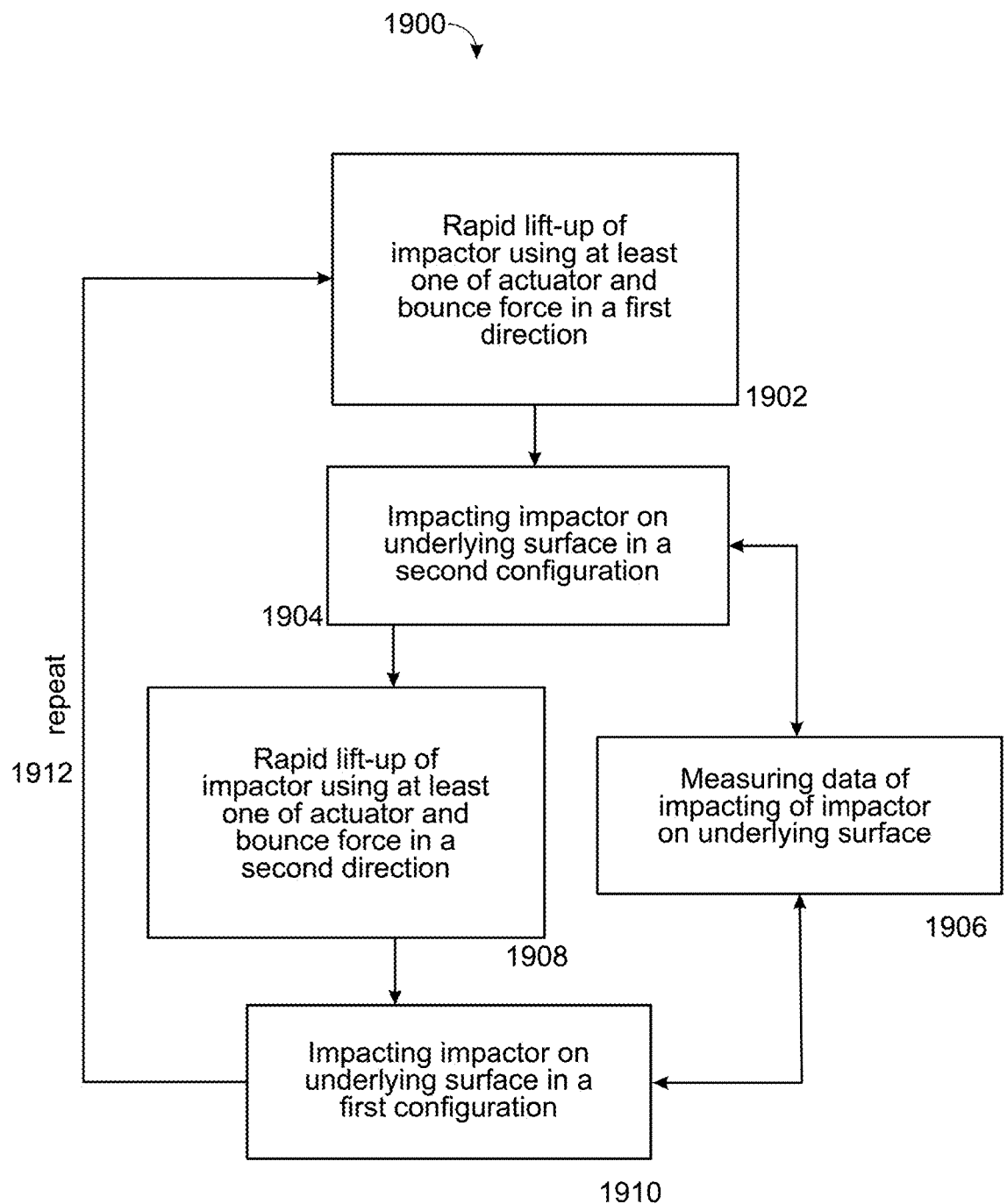
FIG. 19 is a flowchart of using a bounce impact system, in accordance with an exemplary embodiment of the invention.

FIG. 19 is a flowchart 1900 of using a DSBI 200, in accordance with an exemplary embodiment of the invention. In an embodiment of the invention, the system starts with movement (1902) of an impactor, as examples, those described herein, from a first configuration and in a first direction towards a second configuration. Optionally, movement is achieved through actuated movement, for example from a motor. Additionally, alternatively and/or or optionally, movement is achieved through the use of bouncing force, for example if the impactor is rebounding from a previous impact with an underlying surface. This movement (1902) phase ends when the impactor is impacted (1904) in the second configuration, in some embodiments of the invention. In some embodiments, the impacting (1904) is measured (1906) by at least one sensor, optionally an array of sensors.

Once impacting (1904) occurs, a second movement phase occurs where rapid lift-up of the impactor by the actuator and/or bounce force (from the impacting (1904)) moves (1908) the impactor in a second direction, opposite the first direction, from the second configuration towards the first configuration. The end of this second movement phase is triggered by impacting (1910) the impactor on the underlying surface in the first configurations. As with the second configuration impacting (1904), measurement (1906) of impact data from impact (1910) in the first configuration is optionally conducted.

In some embodiments of the invention, the movement and impacting cycle (1902-1910) is repeated (1912) for conducting additional measuring (1496) and accumulation of data.

In some embodiments of the invention, this cycle is used for a plurality of impact systems (such as in systems 200, 300, 1000) for the measurement and accumulation of enhanced amounts of impact data in relation to using just a single impact system 200. It should be noted that enhanced impact numbers (and thus, measurements) created by not only system 200 singly, but especially in a pluralized form of system 300, 1000, generates higher quality data while also enabling faster actual speed of the measuring system (i.e. the system can move at a higher velocity, for example over 50 mph, over the underlying surface being measures), which not only provides better measurement data, but also reduces a common disadvantage of current technology which is typically employed using a low velocity hand cart, for example, under 5 mph. Impact rate, PRF, can be altered by adjusting the speed of the actuator or actuators in the system 200, 300, 1000, in some embodiments of the invention.

It should be further understood that the methodology shown in flowchart 1900 is optionally used in ACE system 100, in combination with at least one of acoustic scanning (MEMS), electromagnetic wave (GPR), video image, and/or position data (GPS) collection.

Figure 20:
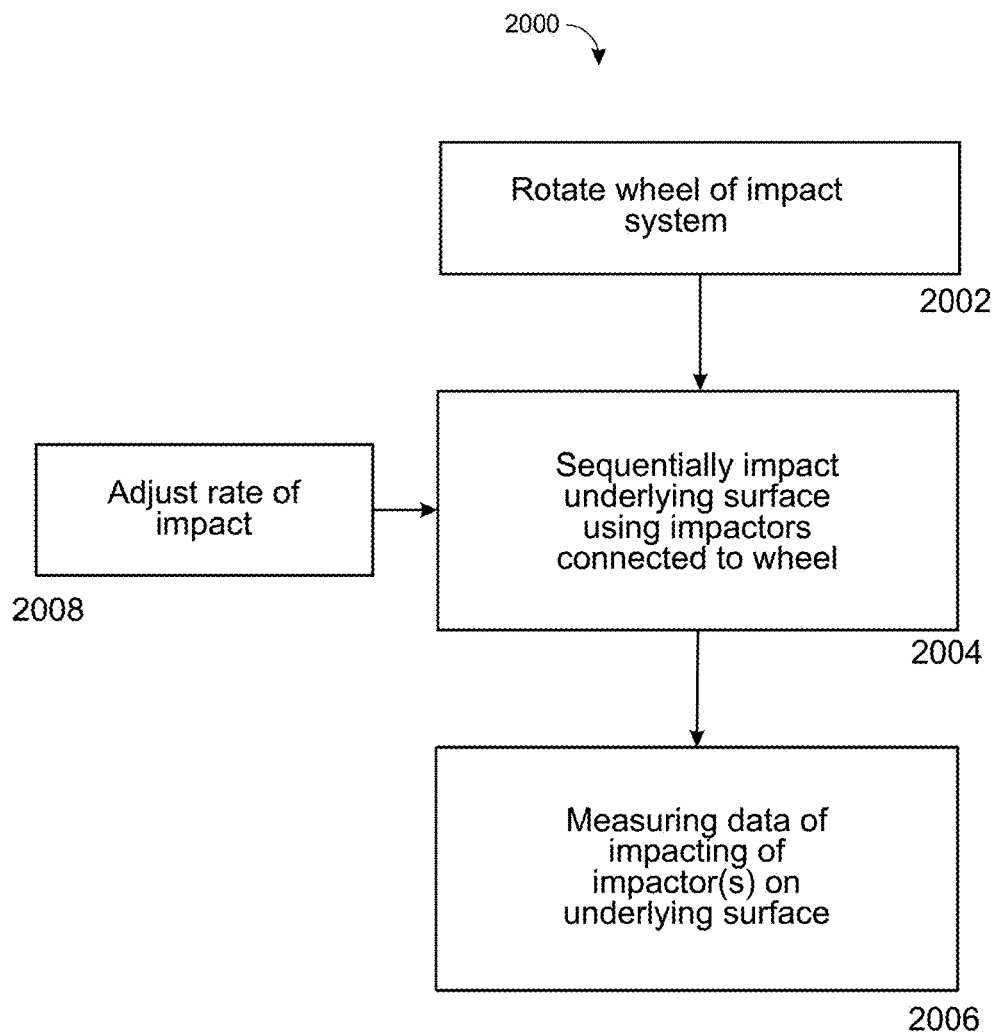
FIG. 20 is a flowchart of using a circular or spiral rolling impact system, in accordance with an exemplary embodiment of the invention

FIG. 20 is a flowchart 2000 of using a circular or spiral rolling impact system 1700, 1800, in accordance with an exemplary embodiment of the invention. In an embodiment of the invention, the system 1700, 1800 is provided with linear movement over the underlying surface being scanned (typically forward movement, although could be reverse) causing rotation (2002) of a wheel to which at least one impactor is attached. As the wheel rotates (2002), the at least one impactor is imparted with motion about a central axis of the wheel, causing the impaction (2004) of the impactor on the underlying surface. It should be understood that in an embodiment with a plurality of impactors, these impactors sequentially impact the underlying surface as the wheel rotates (2002), as opposed to just one impactor hitting the surface as it comes around on the wheel, if in a single impactor embodiment. As the at least one impactor impacts the underlying surface, impact data is measured (2006) by at least one sensor, optionally by a sensor array.

In an embodiment of the invention, the rate of impacting (2004) is adjusted (2008) by performing one or more of increasing or decreasing the velocity of the overall system (e.g. if it is mounted on a trailer being pulled by a vehicle or mounted on a vehicle), modifying the number of impactors, and/or modifying the configuration of impactors on the wheel.

It should be further understood that the methodology shown in flowchart 2000 is optionally used in ACE System 100, optionally in combination with at least one of acoustic scanning (MEMS), electromagnetic wave (GPR), video image, and/or position data (GPS) collection.

In some embodiments of the invention, hardware for performing selected tasks such as reading, storing, processing, and/or outputting data from at least one of acoustic scanning (MEMS), electromagnetic wave (GPR), video image, and/or position data (GPS) collection individually and/or in combination could be embodied in a computer/controller. Hardware for performing selected tasks, such as described herein, could be implemented as a chip or a circuit, optionally as a part of a computer/controller. As software, selected tasks according to embodiments of the invention could be implemented as a plurality of software instructions being executed by a computer/controller using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network and/or communication connection is provided as well. A display and/or a user input device such as a keyboard or mouse are optionally provided as well.

Figure 25:
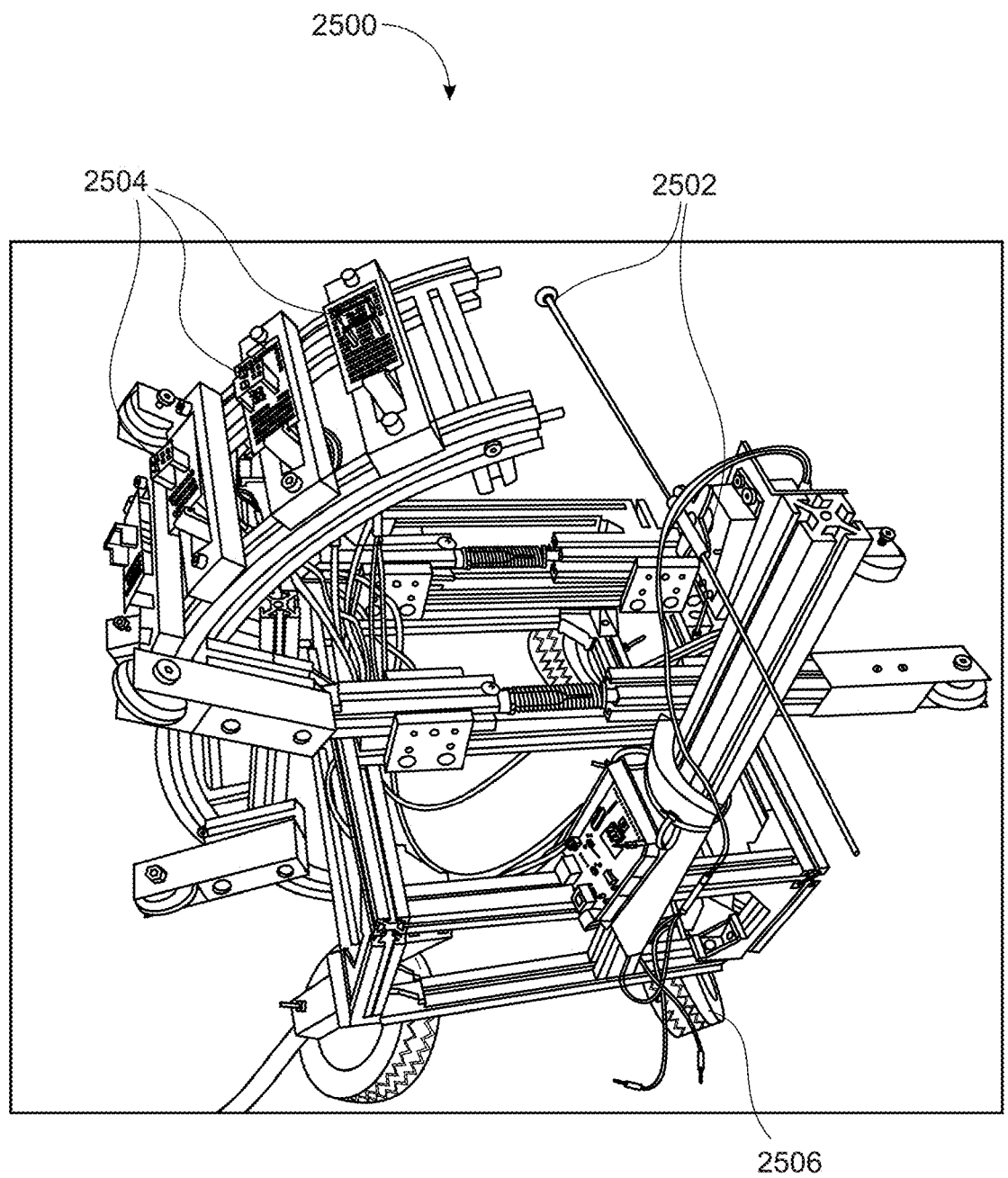
FIG. 25 is a perspective view of an integrated rapid cylindrical infrastructure monitoring system, in accordance with an exemplary embodiment of the invention; and, FIGS. 26A and 26B show the system of FIG. 25 in situ and an exemplary scanning result, respectively, in accordance with an exemplary embodiment of the invention.

FIG. 25 is a perspective view of an integrated rapid cylindrical infrastructure monitoring system 2500, as an exemplar of an ACE system 100, in accordance with an exemplary embodiment of the invention. As referenced above, the ACE system 100 does not have to be used on a flat or substantially flat underlying surface 210. In some embodiments, the ACE system 100 is adapted/configured for use with a curved or rounded underlying surface, such as a pipe 2600 (shown in more detail with respect to FIG. 26A), using the integrated rapid cylindrical infrastructure monitoring system 2500.

In an embodiment of the invention, the integrated rapid cylindrical infrastructure monitoring system 2500 comprises at least one of an auto-impacting system 2502, sensors 2504 (e.g. non-contact and/or MEMS), wheels 2506, and shock absorbers 2508. The shock absorber(s) 2508 and wheels 2506 are designed to provide consistent distances between sensors and the underlying surface 2600 (lift-off distance), for example using the springy nature of the shock absorbers to compress or extend depending on the varying diameter of the pipe as the system 2500 passes through it. In some embodiments of the invention, the shock absorbers can accommodate diameter changes of ±5 cm. Optionally, the range of motion of the shock absorbers is 2508 more or less than ±5 cm. In some embodiments of the invention, different shock absorbers 2508 are used for different pipe sizes, and are modular and/or interchangeable.

In an embodiment of the invention, the auto-impacting system 2502 is operated by a motor and is designed to generate consistent and maximized mechanical wave amplitude in a inhomogeneous material or materials of the underlying surface. It should be understood this system 2502 can use a DSBI system and/or motor, such as described elsewhere herein, and functions in a similar fashion. That is, flipping from one side to the other, optionally using a bouncing force as an impetus to motion of the impactor. Representative advantages of the system 2500 are providing high impact force to increase a signal-to-noise ratio on inhomogeneous concrete and allowing a rapid and consistent PRF for high-speed inspection. In an embodiment of the invention, the impactor is substantially spherical and is designed with a 12 mm low-carbon steel ball and high elastic stainless-steel wire, entirely avoiding or dampening additional resonance frequency noises. In some embodiments of the invention, other sensors such as LIDAR, GPR, and/or GPS are used system 2500.

Figures 26A, 26B:
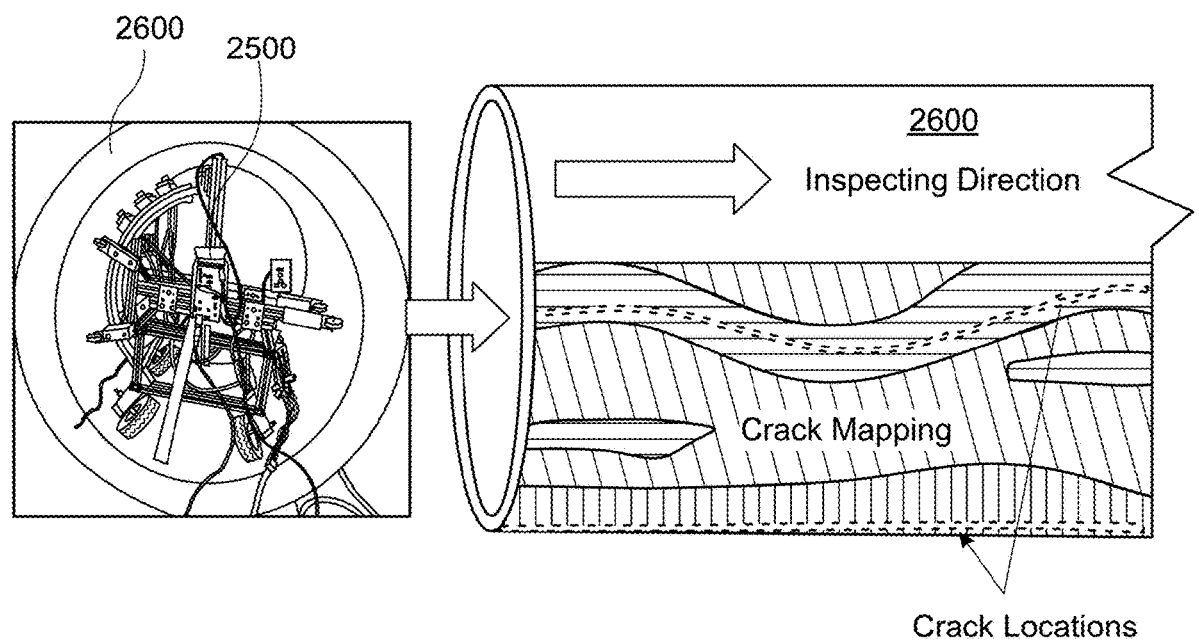

FIGS. 26A and 26B show the system 2500 of FIG. 25 in situ in a pipe 2600 and an exemplary scanning result, respectively, in accordance with an exemplary embodiment of the invention. As can be seen in FIG. 26A, the system 2500 crawls/rolls through the pipe 2600 wherein the auto-impacting system 2502 is afforded the ability to impact on the inner surface of the pipe 2600 as the system 2500 moves. As described elsewhere herein with respect to other embodiments, sensed data is conveyed to at least one controller/processor and/or other hardware for processing and/or analysis. An example of such analysis output is shown in FIG. 26B.

Example

Reference is now made to the following Example, which together with the above descriptions illustrate some embodiments of the invention in a non-limiting fashion.

Figure 21:
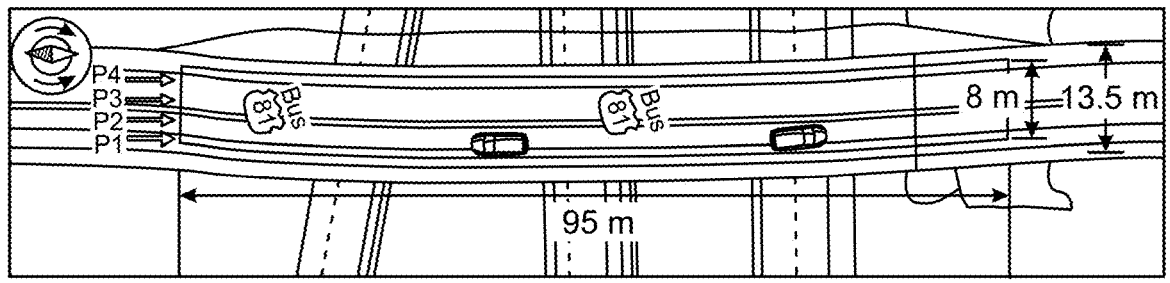
FIG. 21 is a top view of a test scan area, in accordance with an exemplary embodiment of the invention.

FIG. 21 is a top view of a test scan area 2100 including a bridge deck 2102 as the underlying surface being scanned for defects, in accordance with an exemplary embodiment of the invention. In this Example, the bridge deck 2102 was a 95 m long and 13.5 m wide concrete bridge in Texas, United States. Inspection of the bridge deck 2102 was performed using an ACE system 100, more specifically, the integrated rapid infrastructure monitoring system 1000 shown and described with respect to FIGS. 10, 11. This bridge was constructed in 1972 and had two lanes that carry two-way traffic. The integrated rapid infrastructure monitoring system 1000 was used to cover the 95 m long length and 8 m width of the bridge deck 2102 in 4 separate, 2 m wide, scanning paths, see P1-P4 in FIG. 21.

As described elsewhere herein, the integrated rapid infrastructure monitoring system 1000 utilized the MAS unit 300, including the plurality of DSBI systems and MEMS sensors, for evaluating delamination and vertical crack defects in the bridge deck 2102. The system 1000 also utilized GPR for identifying reinforcement corrosion within the bridge deck 2102 structure.

Figure 22:
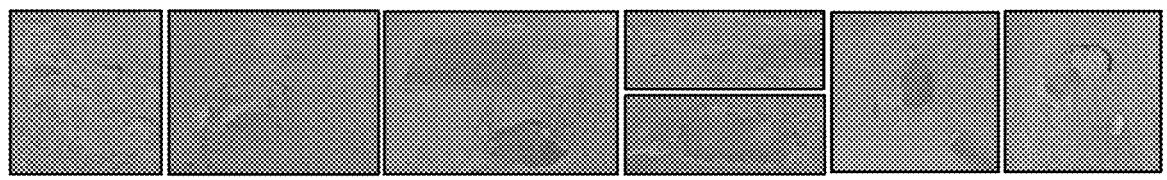
FIG. 22 shows image detected surface damage, in accordance with an exemplary embodiment of the invention.

During the inspection, visual inspections were also performed after the bridge scanning with the recorded video. As a result, 33 spalling, 23 patch-repaired areas, and two major longitudinal cracks were identified through visual inspection. FIG. 22 shows several surface defects from the recorded video images. In addition, 3-D ultrasonic tomography scanning was performed in 10 different locations to compare obtained data.

The inspection results provided information on the severity of delamination, vertical crack, and reinforcement corrosion as demonstrated in the generated 2-D energy intensity (EI) map shown in FIG. 23A. The 2-D EI map is created using post-processing calculations. The 2-D EI colormap is obtained by interpolating a 2-D matrix in a spatial meshed grid. The 2-D matrix for the colormap is the EI matrix calculated by Eq. (2), described above with respect to FIG. 12. To define the damage severity, the severity factors are calculated to the ratio of the delamination area EI to intact area EI to present the wave response change by delamination (i.e., severity factors of good, moderate damage, and severe damage condition: 5, 7.8, and 9). In the field inspection data, 25 intact EI results are used to define the 2-D EI map color range (in this example, $1 \times 10^7$ to $1.9 \times 10^7$). It should be noted that the present methodology uses the 2-D EI colormap, which is based on the sum of spectral magnitude as EI, to present the detected delamination rather than what would be typically used or indicated by common wisdom in the industry, that is, the magnitude of peak frequencies (using a 2-D transparent colormap instead).

Figure 23B:
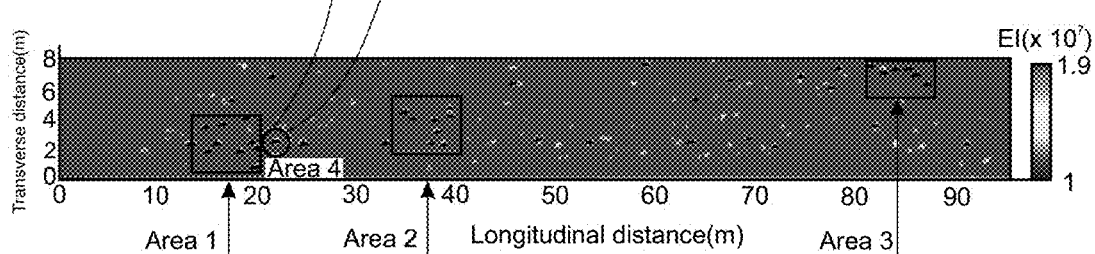
FIGS. 23B-23D are a delamination map, a corrosion map, and a vertical crack map, respectively, in accordance with an exemplary embodiment of the invention.
Figure 23C:
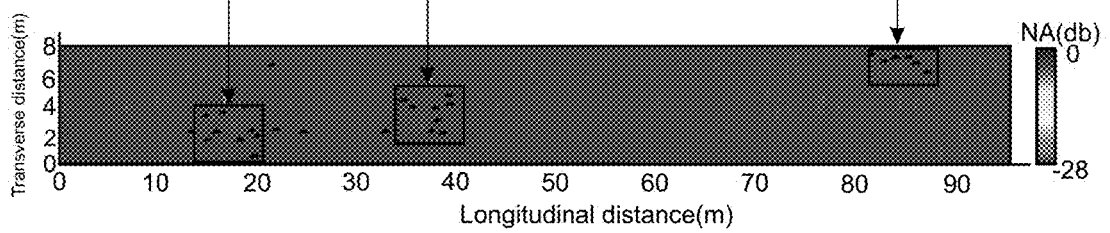
Figure 23D:
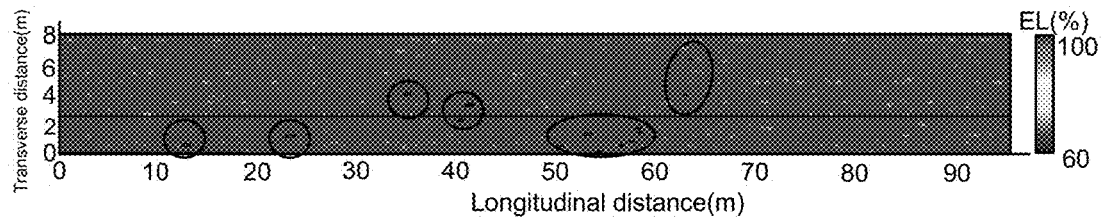

FIGS. 23B-23D are a delamination map, a corrosion map, and a vertical crack map, respectively, generated in the course of the Example scanning procedure, in accordance with an exemplary embodiment of the invention. The 2-D EI colormap of FIG. 23A presents the zoomed-in part of the red circle of "Area 4" shown in FIG. 23B. This part is one example of the high-EI area with a 1.2 m×2 m delamination size. Based on the fact the surface image around the area shows no surface damage, this area presents only internal delamination.

The reinforcement corrosion map, FIG. 23C, presents the corroded reinforcement locations and corrosion levels by calculating the depth-corrected normalized amplitude (NA) of EM waves according to the post-processing procedure shown and described with respect to FIG. 15. Some delamination areas are found in the same location of the corroded reinforcement (e.g., "Areas 1-3"). Ultimately, these areas possibly reflect critical damage (e.g., potholes) due to the negative interaction as mentioned above.

The vertical crack map displays the highest positive energy loss (EL) in the circled areas, as shown in FIG. 23D. A comparative study is performed between the crack map and visual inspection results. Based on the study, several surface-opening cracks are presented as high EL areas. In addition, there are internal cracks in a high EL area without a surface-opening crack.

Figure 24A:
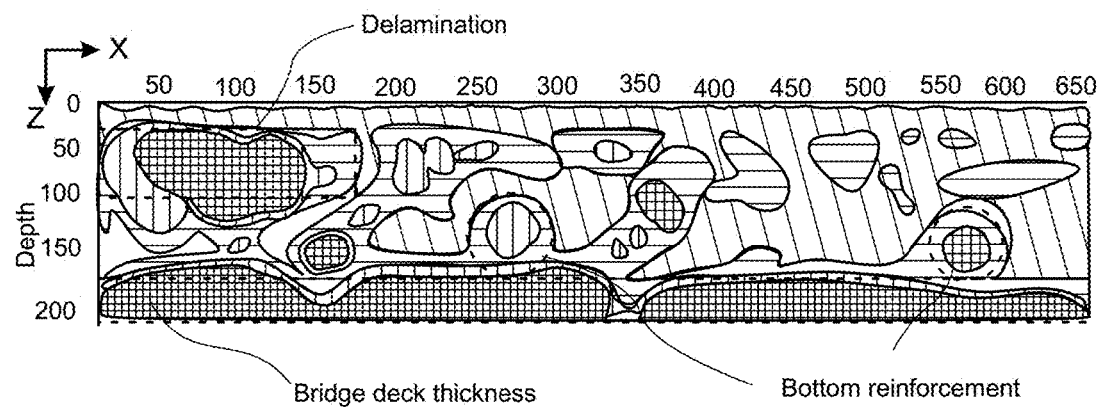
FIGS. 24A-24B show a 2-D cross-sectional view and a 3-D perspective view, respectively, of an ultrasonic tomography scanning result of the indicated area in FIG. 23B, in accordance with an exemplary embodiment of the invention.
Figure 24B:
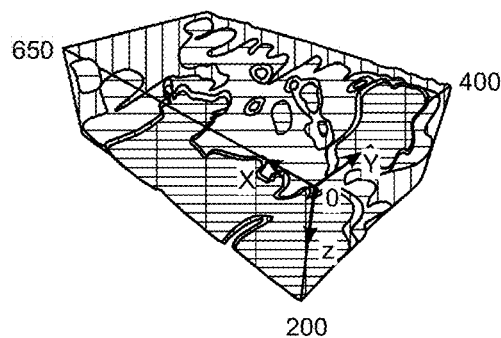

FIGS. 24A-24B show a 2-D cross-sectional view and a 3-D perspective view, respectively, of an ultrasonic tomography scanning result of the indicated "Area 4" in FIG. 23B, in accordance with an exemplary embodiment of the invention. For additional verification of the delamination detection, ultrasonic tomography scanning is conducted. The scanned image shows both delamination and bridge deck thickness as the strong wave reflection (see cross-hatched area). The 3-D scanned area enables investigation of the delaminated and intact area, which is verified by the delamination of FIG. 23B. In addition, scattered waves (horizontal lining and vertical lining) are shown near the delaminated area. This indicates that there is a void or degraded concrete near the delamination.

In summary of the present invention in general and in this Example, the ACE system 100 deploys the DSBI system, MAS unit, and AHAS platform to obtain high inspection quality regarding data collection resolution, wave energy, and consistent wave source. The high inspection quality is obtained by providing higher PRF, proper impact design, and high-resolution sensor deployment. The following representative, but non-limiting details, are presented from laboratory testing and the field test using the ACE system 100:

The developed DSBI system shows the high PRF and impact energy to detect delamination of different sizes by providing a sufficient incident wave to generate the flexural vibration mode. In addition, the sufficient incident wave allows the detection of vertical cracks by providing a proper surface wave propagation for measuring the wave attenuation.

The MAS unit design allows 30 cm resolution for the delamination detection and 10 cm resolution for the vertical crack detection. These data collection resolutions help to obtain a high inspection quality and reliable inspection result by presenting the high resolution of the colormaps.

The developed ACE system using the DSBI system and the AHAS platform achieve faster scanning speeds and a nonstop inspection system. These achievements significantly decrease the inspection time and increase safety by reducing the exposure of inspectors to live traffic. In addition, the post-processing process described herein provides clear, quantified damage ranges for the elimination of subjectivity.

The adjustable frame design allows for ease of installation of the MAS unit. In addition, adding an additional MAS unit, an option described elsewhere herein, increases the data collection resolution by providing the additional MAS with the set of impacting and receiving.

It is expected that during the life of a patent maturing from this application many relevant or useable or compatible impactors will be developed and the scope of the term impactor is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The term "plurality" means "two or more".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

I claim:

1. An integrated rapid infrastructure monitoring system for identifying defects in an underlying surface, comprising:
    at least one actuator; and,
    at least one impactor operatively connected to the actuator, wherein the actuator is configured to transition the integrated rapid infrastructure monitoring system from a first configuration with at least one of a motive force and an impact bounce force of the impactor, where the impactor is located on a first side of the integrated rapid infrastructure monitoring system, to a second configuration, where the impactor is located on a second side of the integrated rapid infrastructure monitoring system; and
    wherein the transition from the first configuration to the second configuration alternates in a reversing and bi-directional manner.

2. The integrated rapid infrastructure monitoring system according to claim 1, further comprising a high elastic cable or wire connecting each at least one actuator to each at least one impactor.

3. The integrated rapid infrastructure monitoring system according to claim 1, wherein the at least one impactor is at least partially constructed at least one of metal and carbon.

4. The integrated rapid infrastructure monitoring system according to claim 1, wherein the at least one actuator is configured to transition the integrated rapid infrastructure monitoring system from the second configuration to the first configuration with at least one of a motive force and an impact bounce force of the impactor.

5. The integrated rapid infrastructure monitoring system according to claim 1, wherein at the least one actuator is a DC motor.

6. The integrated rapid infrastructure monitoring system according to claim 5, wherein the DC motor has more than 180 degrees of rotation.

7. The integrated rapid infrastructure monitoring system according to claim 5, wherein the DC motor has at least 1000 RPM speed.

8. The integrated rapid infrastructure monitoring system according to claim 1, wherein at least one of the first configuration and the second configuration includes at least one impactor physically contacting the underlying surface.

9. The integrated rapid infrastructure monitoring system according to claim 1, further comprising at least one sensor for sensing impacts on the underlying surface by the at least one impactor.

10. The integrated rapid infrastructure monitoring system according to claim 9, wherein the at least one sensor is at least one of a MEMS sensor, GPR, LIDAR, a tomographic sensor, a position sensor and an image sensor.

11. The integrated rapid infrastructure monitoring system according to claim 1, further comprising an automatic height-adjustable system with a frame and at least one elevation actuator operatively connected to the frame by at least one frame element and configured to raise and/or lower the frame relative to the underlying surface.

12. The integrated rapid infrastructure monitoring system according to claim 11, further comprising at least one distance sensor for sensing distance of the frame from the underlying surface.

13. The integrated rapid infrastructure monitoring system according to claim 11, further comprising at least one controller for automatically controlling the at least one elevation actuator to raise and/or lower the frame to a desired distance from the underlying surface during integrated rapid infrastructure monitoring system movement.

14. A method of using an integrated rapid infrastructure monitoring system for scanning an underlying surface, comprising:
    moving at least one impactor in a first direction from a first configuration of the integrated rapid infrastructure monitoring system towards a second configuration;
    impacting the at least one impactor on the underlying surface in the second configuration;
    measuring the impacting using at least one sensor;
    moving the at least one impactor in a second direction from the second configuration towards the first configuration;
    impacting the at least one impactor on the underlying surface in the first configuration; and,
    measuring the impacting using at least one sensor, wherein alternating moving from the first configuration to the second configuration is reversing and bi-directional movement.

15. The method according to claim 14, wherein moving is effectuated by at least one of an actuator and a bouncing force from the impacting.

16. The method according to claim 14, further comprising automatically raising and/or lowering at least one of the at least one impactor and the at least one sensor to a desired distance above the underlying surface during scanning using at least one elevation actuator.

17. The method according to claim 14, wherein the at least one impactor is a plurality of impactors which operate on a preset delay to, in combination, achieve a desired pulse repetition frequency of the integrated rapid infrastructure monitoring system.

18. The method according to claim 14, wherein the at least one sensor is used to collect at least one of mechanical wave data, electromagnetic wave data, imaging data and position data.

19. The method according to claim 18, wherein two or more of mechanical wave, electromagnetic wave, image and position data collection occurs simultaneously.

20. The method according to claim 14, further comprising adjusting the rate of impacting by performing at least one of:
    increasing or decreasing the velocity of the integrated rapid infrastructure monitoring system;
    modifying the number of impactors; and,
    modifying the configuration of the at least one impactor on a wheel to which the at least one impactor is attached.

* * * * *